US008542655B2

(12) United States Patent
Kuroda et al.

(10) Patent No.: US 8,542,655 B2
(45) Date of Patent: Sep. 24, 2013

(54) RADIO COMMUNICATION METHOD AND SYSTEM CAPABLE OF REDUCING INTER-CELL INTERFERENCE, AND ITS MOBILE STATION AND BASE STATION

(75) Inventors: Nahoko Kuroda, Tokyo (JP); Jinsock Lee, Tokyo (JP)

(73) Assignee: NEC Corporation, Tokyo (JP)

( * ) Notice: Subject to any disclaimer, the term of this patent is extended or adjusted under 35 U.S.C. 154(b) by 708 days.

(21) Appl. No.: 12/063,016

(22) PCT Filed: Aug. 22, 2006

(86) PCT No.: PCT/JP2006/316370
§ 371 (c)(1),
(2), (4) Date: Apr. 3, 2008

(87) PCT Pub. No.: WO2007/023787
PCT Pub. Date: Mar. 1, 2007

(65) Prior Publication Data
US 2008/0285477 A1    Nov. 20, 2008

(30) Foreign Application Priority Data

Aug. 23, 2005 (JP) ................. 2005-241874
Feb. 1, 2006 (JP) ................. 2006-024637

(51) Int. Cl.
*H04W 4/00*  (2009.01)
(52) U.S. Cl.
USPC ........................................ 370/332
(58) Field of Classification Search
USPC ......................... 370/252, 332, 208
See application file for complete search history.

(56) References Cited

U.S. PATENT DOCUMENTS

| 5,276,908 | A * | 1/1994 | Koohgoli et al. | 455/454 |
| 5,379,451 | A * | 1/1995 | Nakagoshi et al. | 455/435.1 |
| 6,314,082 | B1 * | 11/2001 | Malmgren | 370/208 |
| 7,426,176 | B2 * | 9/2008 | Liu et al. | 370/206 |

(Continued)

FOREIGN PATENT DOCUMENTS

| EP | 1473956 A2 | 11/2004 |
| JP | 2001-506071 A | 5/2001 |

(Continued)

OTHER PUBLICATIONS

Sophia Antipolis, "Multi-cell Simulation Results for Interference Co-ordination in new OFDM DL", Jun. 20-21, 2005, pp. 1-10, Alcatel, France.

(Continued)

*Primary Examiner* — Mark Rinehart
*Assistant Examiner* — Mohammad Anwar
(74) *Attorney, Agent, or Firm* — Sughrue Mion, PLLC

(57) ABSTRACT

There is provided a radio communication method capable of reducing inter-cell interference.
In a radio communication system in which each of a plurality of base stations performs radio communication with a mobile station by using one of frequency blocks, the base stations transmit pilot signals using frequency blocks and the mobile station measures the reception quality of the pilot signals of the first base station, measures the reception quality of the pilot signals transmitted by the second base station, generates channel quality information for the frequency block according to the reception quality of the pilot signal of the first base station and the reception quality of the pilot signal of the second base station, and transmits the channel quality information to the first base station.

28 Claims, 28 Drawing Sheets

(56) References Cited

U.S. PATENT DOCUMENTS

| | | | |
|---|---|---|---|
| 7,457,588 B2 * | 11/2008 | Love et al. | 455/67.11 |
| 7,457,622 B2 * | 11/2008 | Kayama et al. | 455/437 |
| 2002/0068534 A1 | 6/2002 | Ue et al. | |
| 2002/0077064 A1 | 6/2002 | Ue et al. | |

FOREIGN PATENT DOCUMENTS

| | | |
|---|---|---|
| JP | 2002-223479 A | 8/2002 |
| JP | 2003-018640 A | 1/2003 |
| JP | 2003-061150 A | 2/2003 |
| JP | 2003-244752 A | 8/2003 |
| JP | 2004-048527 A | 2/2004 |
| JP | 2004-208234 A | 7/2004 |
| JP | 2004-215290 A | 7/2004 |
| JP | 2004-274220 A | 9/2004 |
| JP | 2005-027107 A | 1/2005 |
| JP | 2005-027272 A | 1/2005 |
| JP | 2005-160079 A | 6/2005 |
| JP | 2005-167389 A | 6/2005 |
| KR | 10-2005-0062359 A | 6/2005 |
| WO | 02/09326 A1 | 1/2002 |
| WO | 02/23819 A2 | 3/2002 |

OTHER PUBLICATIONS

Sophia Antipolis, "Interference mitigation-Considerations and Results on Frequency Reuse", Jun. 20-21, 2005, pp. 1-6, Siemens, France.

Communication dated Dec. 23, 2011 from the European Patent Office in counterpart European application No. 06782874.9.

* cited by examiner

FIG.6

| CQI index | SIR [dB] |
|---|---|
| 0 | SIR <-24 |
| 1 | -24 <= SIR <-23 |
| 2 | -23 <= SIR <-22 |
| ... | |
| 24 | -1 <= SIR <-0 |
| 25 | 0 <= SIR |

FIG.11

| INTERFERENCE LEVEL | RECEPTION POWER P[dBm] |
|---|---|
| 0 | P <-120 |
| 1 | -120 <= P <-110 |
| 2 | -110 <= P <-100 |
| ... | |
| 9 | -40 <= P <-50 |
| 10 | -30 <= P |

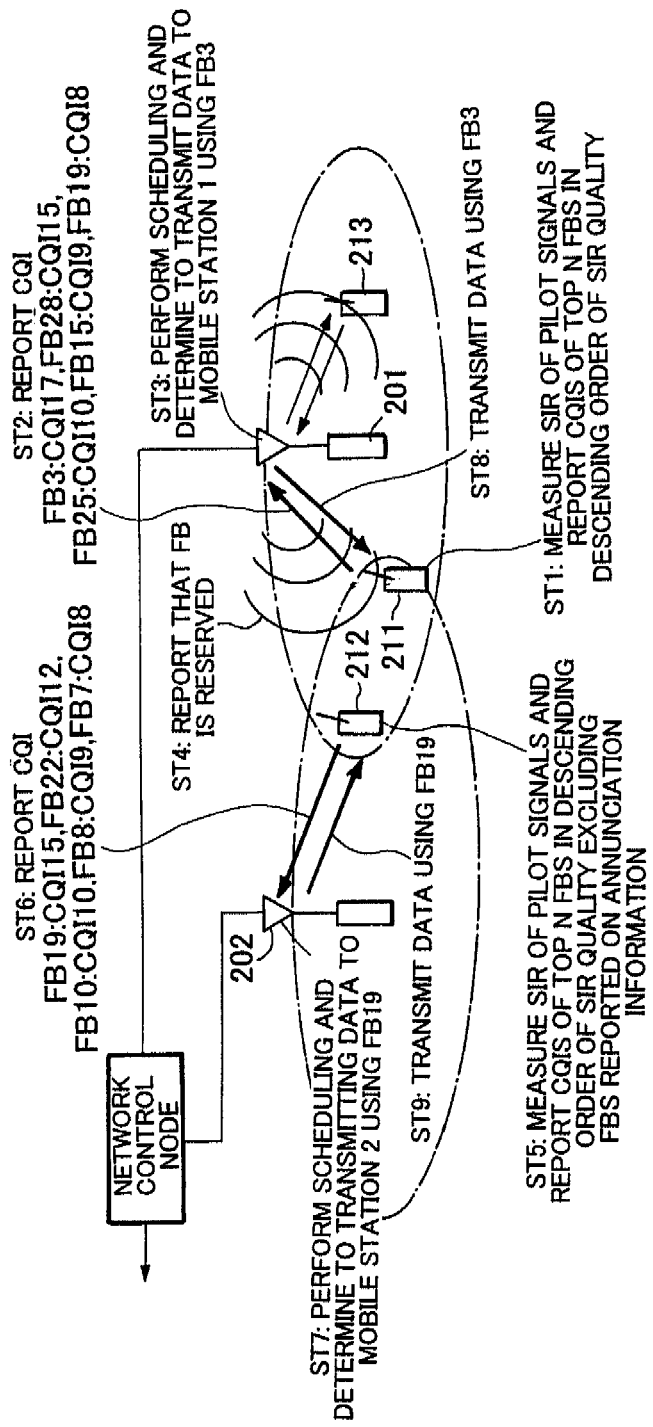

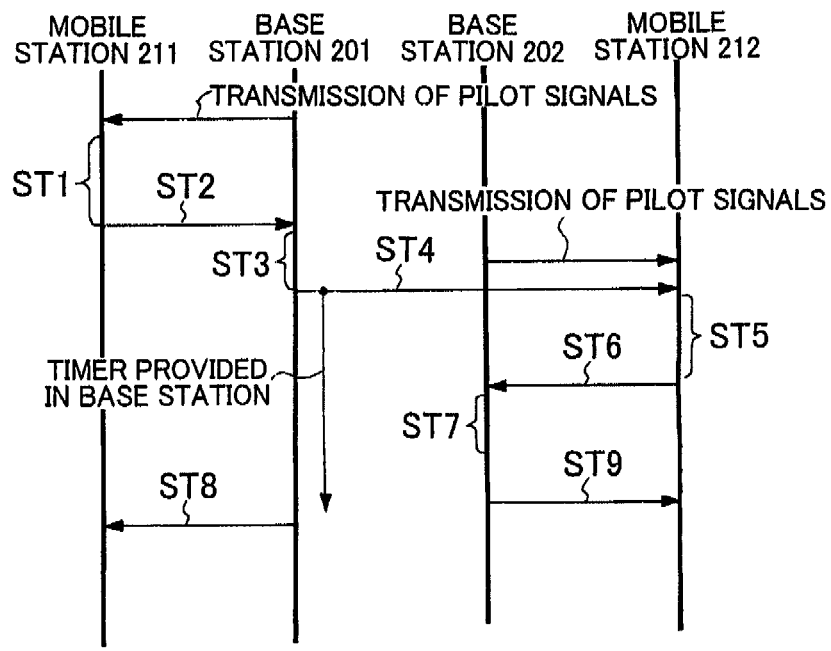
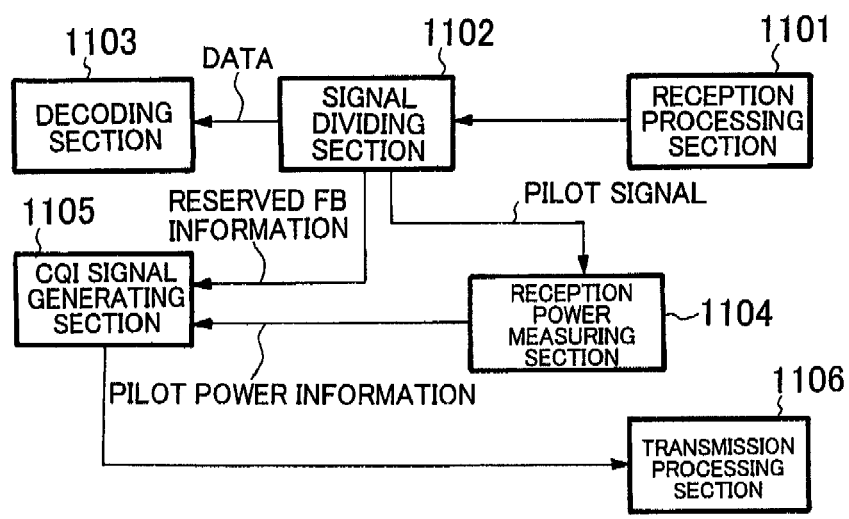

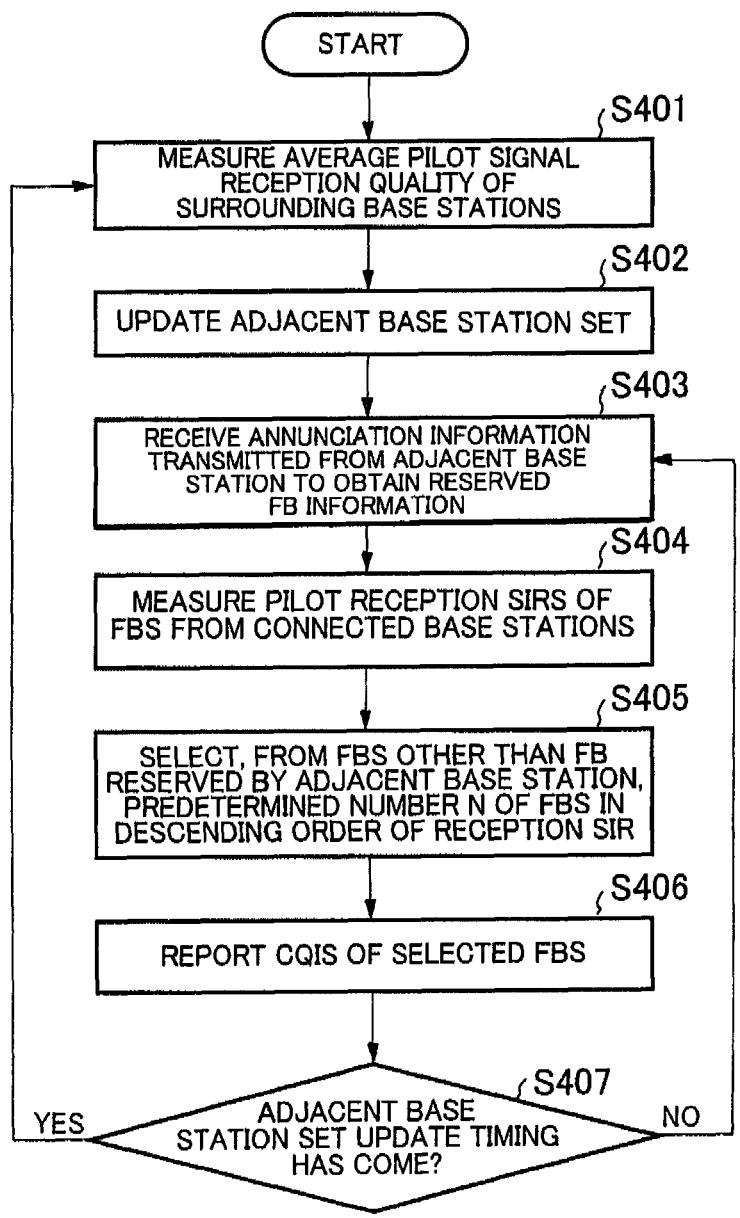

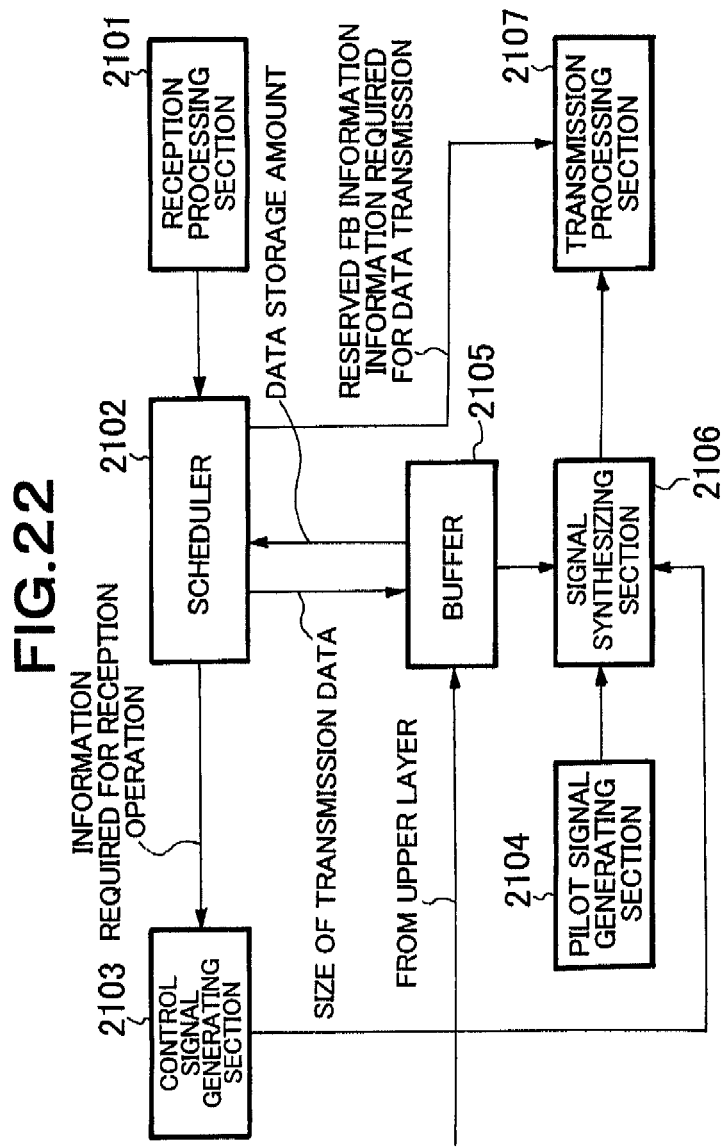

FIG.24

| CQI index | SIR [dB] |
|---|---|
| 0 | NA (Not Available) |
| 1 | SIR < -24 |
| 2 | -24 <= SIR < -23 |
| ... | |
| 25 | -1 <= SIR < 0 |
| 26 | 0 <= SIR |

REPORT FB SET
FB5, 10, 15, 20, 25

| FB# | FB5 | FB10 | FB15 | FB20 | FB25 |
|---|---|---|---|---|---|
| | CQI20 | CQI19 | CQI0 | CQI21 | CQI16 |

FB15 IS RESERVED BY ADJACENT BASE STATION

CQI REPORT FRAME: TOP → CQI REPORT FRAME: TAIL

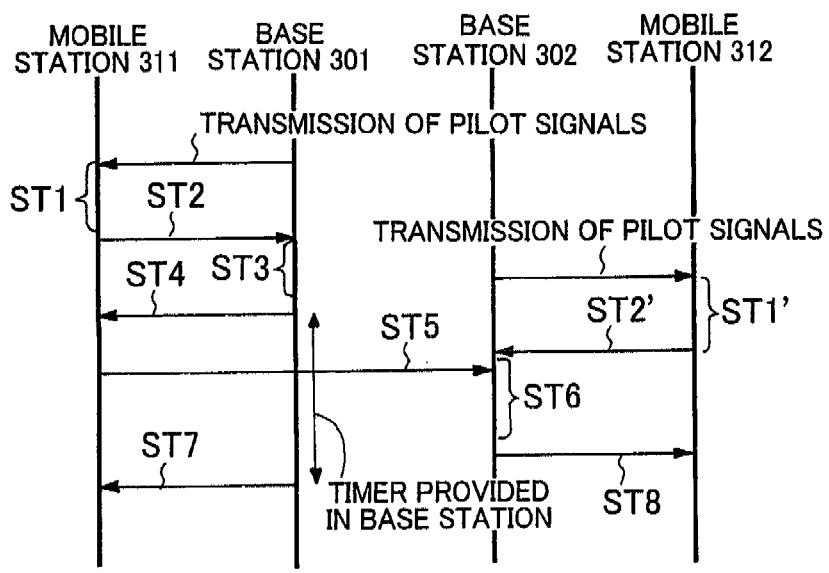
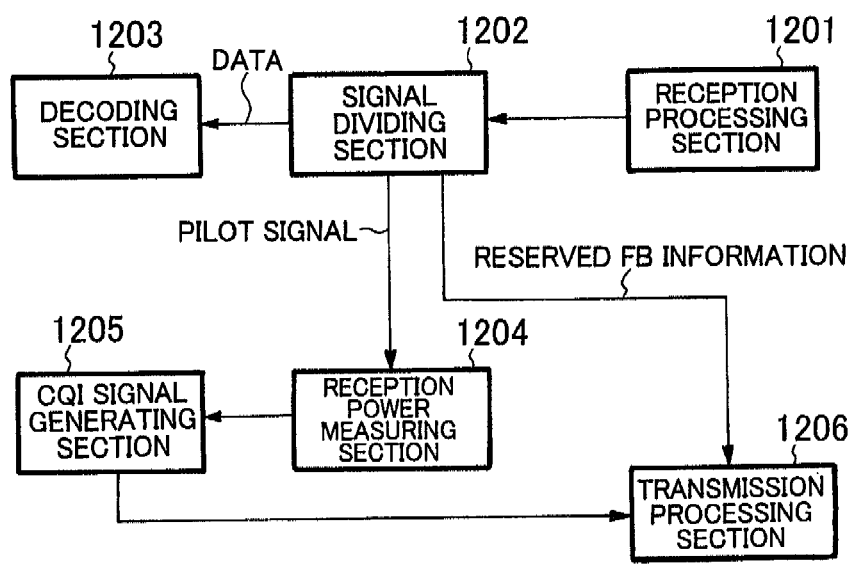

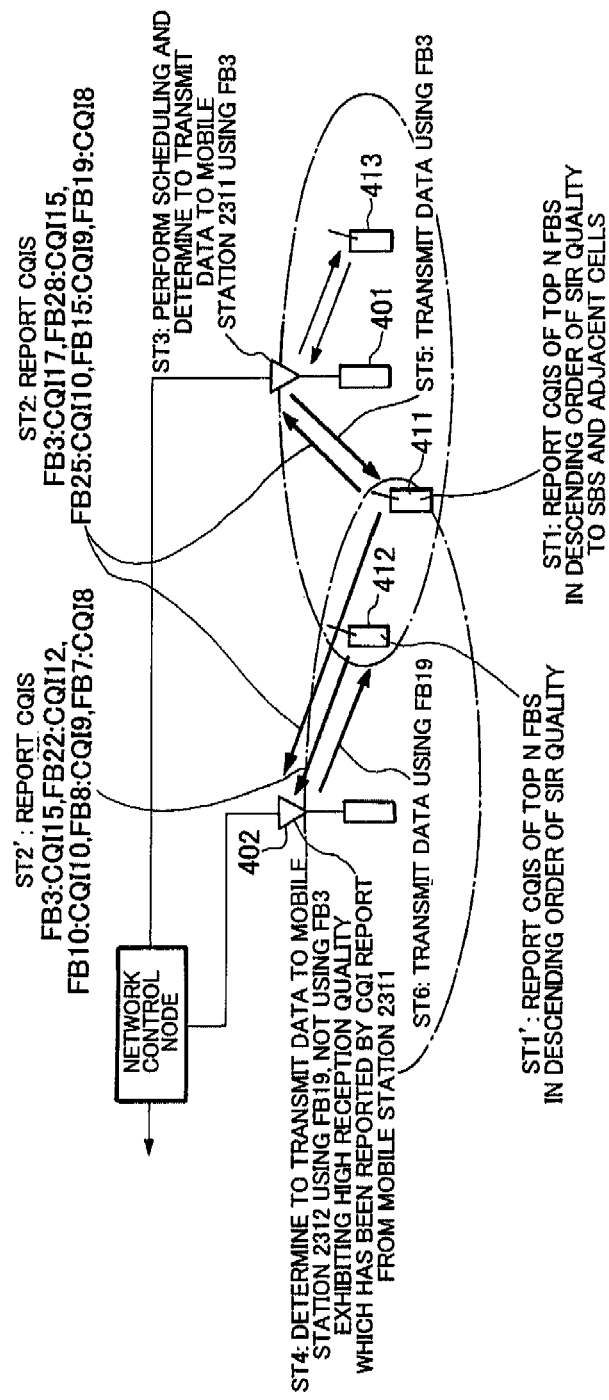

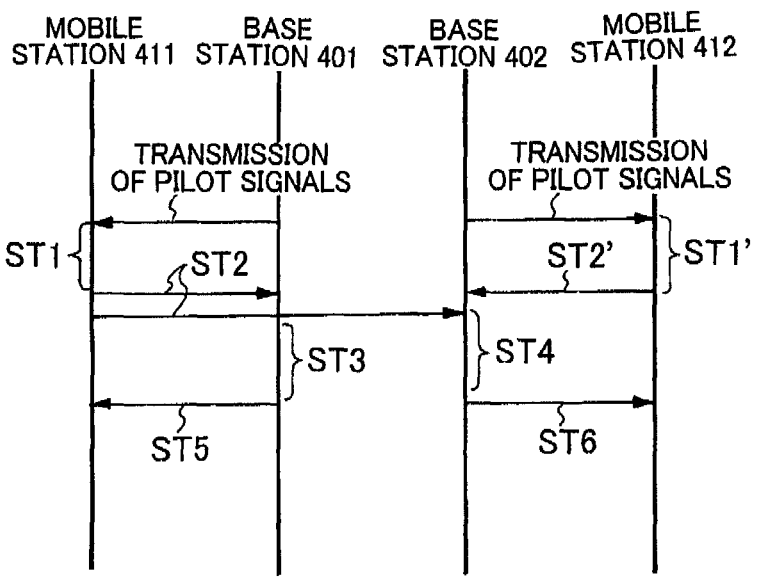
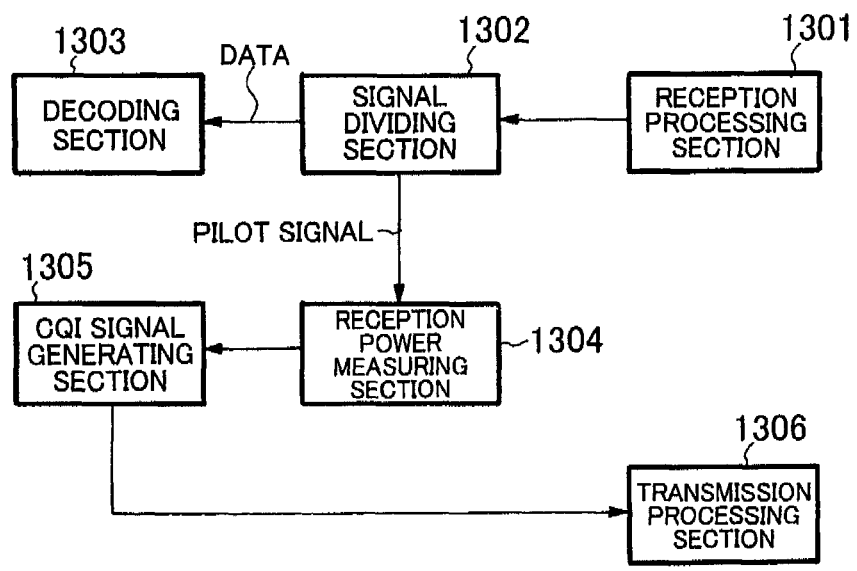

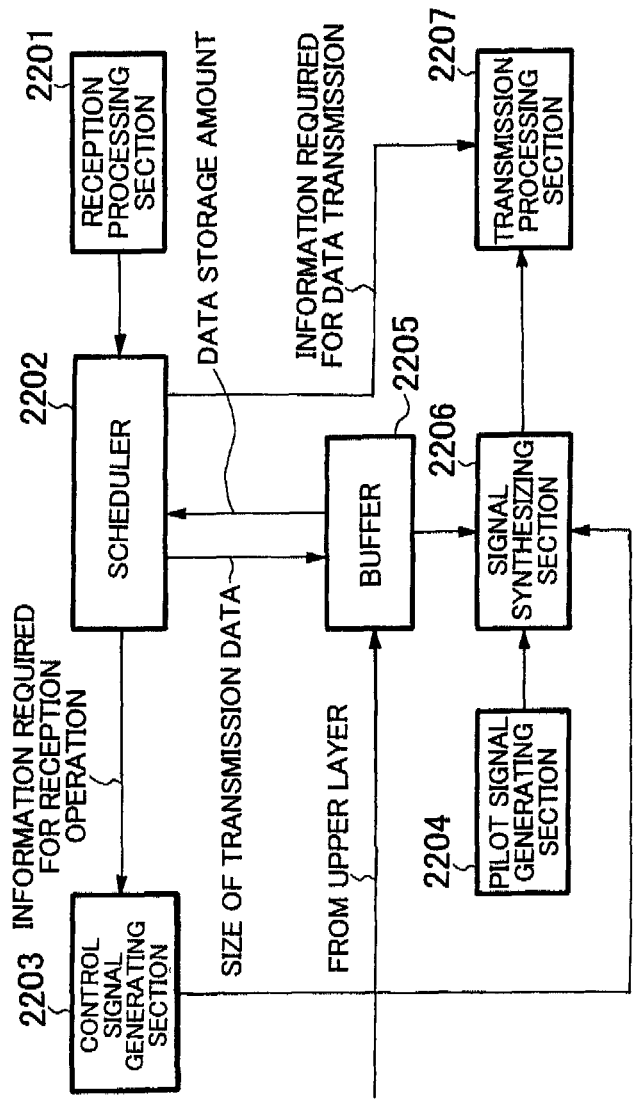

RADIO COMMUNICATION METHOD AND SYSTEM CAPABLE OF REDUCING INTER-CELL INTERFERENCE, AND ITS MOBILE STATION AND BASE STATION

TECHNICAL FIELD

The present invention relates to a radio communication method capable of reducing inter-cell interference in a radio communication system in which a plurality of base stations performs radio communication by using one of frequency blocks in the same frequency band.

BACKGROUND ART

The 3GPP (3rd Generation Partnership Project) is currently considering introduction of an E-UTRAN (Evolved Universal Terrestrial Radio Access Network) system which is an extended model of a W-CDMA system. The examination is made based on an implementation that OFDMA (Orthogonal Frequency Division Multiple Access) is applied to a downlink air interface in the E-UTRAN system.

DS-CDMA (Direct Spreading-Code Division Multiple Access) has been used in the existing W-CDMA system. In the DS-CDMA, signals are transmitted while being subjected to code diffusion and, on the reception side, a desired signal is subjected to back diffusion using the diffusion code to increase a received power density of the desired signal required per symbol, thereby enhancing SIR (Signal-to-Interface Ratio) at the receiving end.

Further, in the W-CDMA system, a scrambling code unique to each cell is multiplied with transmission data. The mobile station knows the scrambling code of the cell to which the own station is connected and receives the transmission data using the scrambling code unique to each cell to which the mobile station is connected. Signals from adjacent cells are still scrambled, and interference signals are randomized, so that even when the data is transmitted from the adjacent cells using the same frequency band and same diffusion code, inter-cell interference can be effectively reduced by the diffusion. Therefore, so-called one-cell reuse in which the same frequency is used in the entire system can easily be achieved.

On the other hand, in a system using the OFDMA, a frequency band used for data transmission is divided into a plurality of orthogonal frequency bands (sub-carriers), and respective sub-carriers are modulated and multiplexed in data transmission, thereby realizing large-capacity transmission. Therefore, as shown in FIG. 1, sub-carriers having satisfactory reception quality and those having poor reception quality exist together in each sub-carrier group due to influence of frequency selective phasing. Thus, in the OFDMA, it is important to stabilize communication quality using a combination of error correction and interleave techniques. Further, since the principle of the OFDMA is that interference from other signals is eliminated using orthogonality of sub-carrier, when data is transmitted using the same sub-carrier from the adjacent cells, large interference is caused between the cells to significantly degrade communication quality. Thus, in a wireless LAN system and the like using the OFDMA, previous setting is required such that the same channel (frequency block composed of a predetermined number of sub-carriers) is not used by adjacent access points. However, when such a multiple-cell repeat is used, a frequency band that can be used by each cell becomes narrower than the entire frequency band that can be used by the entire system, decreasing the frequency use efficiency of the entire system.

Thus, it is proposed that a system shown in FIG. 2 or FIG. 3 is used in the E-UTRAN system to increase the frequency use efficiency of the entire system.

In the system shown in FIG. 2, a state close to one-cell reuse is achieved at the center of each cell while multiple-cell reuse is used at the boundary of each cell so as to restrict a use of a part of the frequency band (refer to, e.g., Non-patent Document 1). That is, at the portion near the cell boundary, a frequency block (FB) other than FBs used by the adjacent cells is used.

Similarly, in the system shown in FIG. 3, all frequency blocks (FBs) are used at the center of each cell while an FB other than FBs used by the adjacent cells is used at the boundary of each cell (refer to, e.g., Non-patent Document 2). In FIGS. 2 and 3, one obtained by bundling a predetermined number of sub-carriers as shown in FIG. 4 is represented as a frequency block (FB), and it is assumed that a plurality of FBs (e.g., FB0 to FB12) can be used in the entire system.

It is now being considered that a mobile station in the E-UTRAN system measures the reception SIR of a pilot signal for each FB and transmits a CQI (Channel Quality Indicator) representing the channel quality of the FBs to each connection base station. Since the CQI measurement value includes interference caused by adjacent base stations, the CQI of the FBs used by adjacent base stations are deteriorated. Thus, it is believed that by designing a configuration that the FBs exhibiting a low CQI value is not transmitted, interfere between adjacent base stations can be reduced to some degree.

[Non-Patent Document 1] 3GPP TSG RAN WG1 LTE Ad Hoc meeting, R1-050594 Multi-cell Simulation Results for Interference Co-ordination in new OFDM DL, Alcatel

[Non-Patent Document 2] 3GPP TSG RAN WG1 LTE Ad Hoc meeting, R1-050599 Multi-cell Interference mitigation—Considerations and Results on Frequency Reuse, Siemens

DISCLOSURE OF THE INVENTION

Problems to be Solved by the Invention

However, the following problems still remain in the systems described above.

When the systems as disclosed in [Non-patent Document 1] and [Non-patent Document 2] are used, it is necessary to make a detailed cell design in determining the arrangement of the base stations and determine the allocation of FBs at the cell boundary portions. The cell shape generally differs depending on the actual geographical shape, so that even if accurate field measurement is carried out for the allocation of the FBs, effective operation cannot be achieved in some cases.

Further, the entire cell design needs to be made from scratch when a new base station is added in the system, which leads to an increase in the man-hour required for the cell design to make it very difficult to add a new base station and degradation (decrease in the frequency use efficiency or decrease in the system throughput due to an increase in the inter-cell interference) of the system performance.

Further, in the scheduling based on a CQI report as shown in FIG. 5, a delay is caused between the CQI measurement timing and time at which data is actually transmitted using an FB having good channel quality based on the result of the CQI measurement due to the time required for the CQR report and scheduling processing performed in the base station. In the meantime, another adjacent base station is likely to have started data transmission to a new mobile station, so that there is a possibility that the channel quality of an FB, which has been reported by the CQI to be good at the transmission timing (frame number 5) degrades from the CQI report time due to an increase in interference caused by other cells. Therefore, a packet loss rate is increased and throughput is decreased.

An object of the present invention is therefore to provide a radio communication method and system capable of solving the following issues:
(1) Realization of FB allocation capable of reducing inter-cell interference as much as possible even if adjacent cells use the same FB at the same timing
(2) Realization of FB allocation capable of preventing adjacent cells from using the same FB at the same timing (Realization of scheduling capable of preventing adjacent cells from using, especially, an FB used for a mobile station which is receiving a service of high QoS or high priority, (e.g., a service with a high real-time demand) at the same time).

Means for Solving the Problems

To solve the above problems, according to an aspect of the present invention, there is provided a radio communication method in which a base station uses one of a plurality of frequency blocks to perform radio communication with a mobile station, characterized by comprising: a step in which the base station transmits signals using the frequency blocks; a step in which the mobile station measures a first reception quality of the signals; a step in which the mobile station measures a second reception quality of the signals; a step in which the mobile station generates channel quality information of the frequency blocks based on the first and second reception quality; and a step in which the mobile station transmits the channel quality information to the base station. The mobile station measures the reception power intensity of the signals as the first reception quality and measures the signal-to-interference ratio (SIR) of the signals as the second reception quality.

Alternatively, the mobile station measures the reception quality of the signals transmitted from a first base station as the first reception quality, measures the reception quality of the signals transmitted from a second base station as the second reception quality, and transmits the channel quality information to the first base station.

According to the present invention, there is provided a radio communication method in which each of a plurality of base stations uses one of a plurality of frequency blocks to perform radio communication with a mobile station, characterized by comprising: a step in which a first base station determines a frequency block used for radio communication with a first mobile station; a step in which the first base station reports to a second base station the frequency block used for radio communication; a step in which the first base station uses the determined frequency block to transmit packets to the first mobile station.

With the above configuration, inter-cell interference can be reduced.

Advantages of the Invention

According to the present invention, it is possible to increase a throughput of the mobile station at the portion near the cell boundary, leading to an increase of a throughput of the entire system. Especially, it is possible to reduce interference from its adjacent cells with respect to a mobile station providing a service of high QoS or high priority, whereby desired service quality is achieved.

BRIEF DESCRIPTION OF THE DRAWINGS

FIG. 6 is a view showing an example of a CQI index;
FIG. 11 is a view showing an example of an interference level conversion table;
FIG. 18 is a view for explaining characteristics of a third embodiment;
FIG. 19 is a sequence diagram of the third embodiment;
FIG. 20 is a configuration view showing the mobile station in the third embodiment;
FIG. 21 is a flowchart showing an operation flow of the mobile station in the third embodiment;
FIG. 22 is a configuration view showing the base station in the third embodiment;
FIG. 24 is a view for explaining a CQI reporting method in a fourth embodiment;
FIG. 26 is a sequence diagram of the fifth embodiment;
FIG. 27 is a configuration view showing the mobile station in the fifth embodiment;
FIG. 28 is a view for explaining characteristics of a sixth embodiment;
FIG. 29 is a sequence diagram of the sixth embodiment;
FIG. 30 is a configuration view of the mobile station in the sixth embodiment;
FIG. 31 is a configuration view showing the base station in the sixth embodiment.

EXPLANATION OF REFERENCE SYMBOLS

1001: Reception processing section
1002: Signal dividing section
1003: Decoding section
1004: Packet error detecting section 1005: Reception power measuring section
1006: CQI signal generating section
1007: Signal synthesizing section
1008: Transmission processing section
2001: Reception processing section
2002: Scheduler
2003: Control signal generating section
2004: Pilot signal generating section
2005: Buffer
2006: Signal synthesizing section
2007: Transmission processing section

BEST MODE FOR CARRYING OUT THE INVENTION

Now, preferred embodiments of the present invention will be described by referring to the accompanying drawings.

Figure 8:
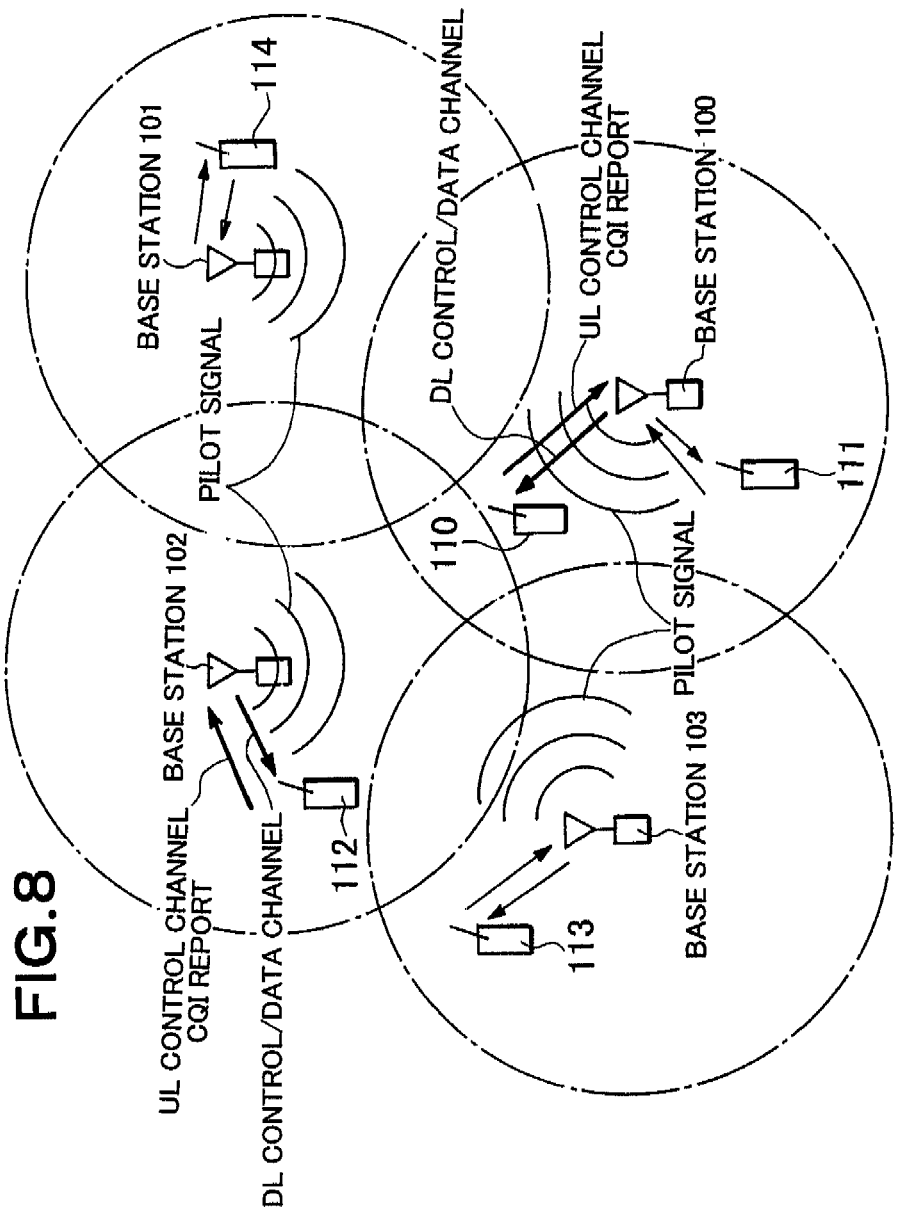
FIG. 8 is a view showing a configuration of a system according to all embodiments of the present invention.

FIG. 8 is a view for explaining a configuration of a system according to all embodiments of the present embodiment.

Figure 1:
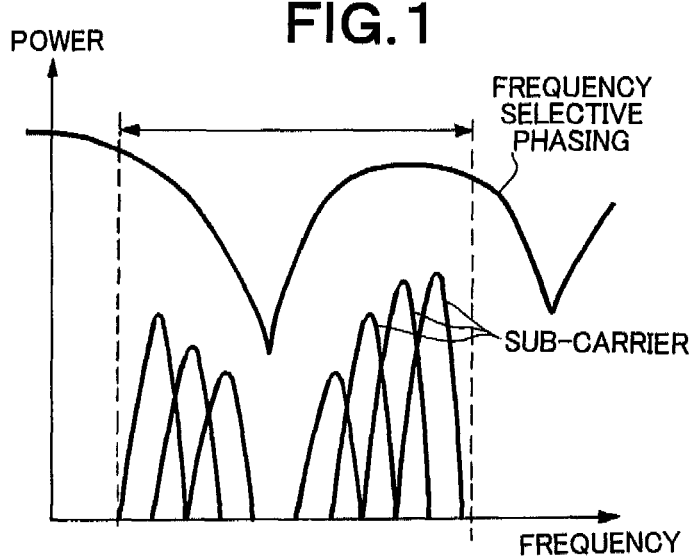
FIG. 1 is a view showing typical characteristics of OFDM.
Figure 2:
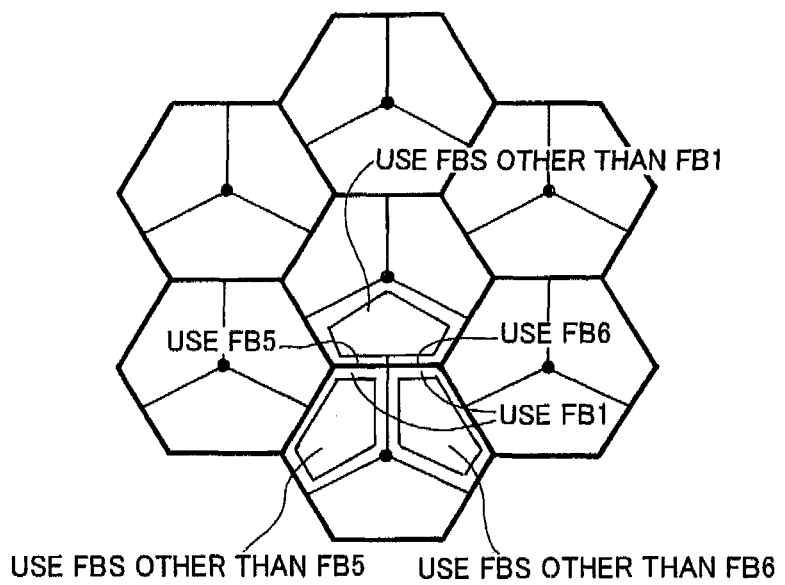
FIG. 2 is a view for explaining a conventional technique.
Figure 3:
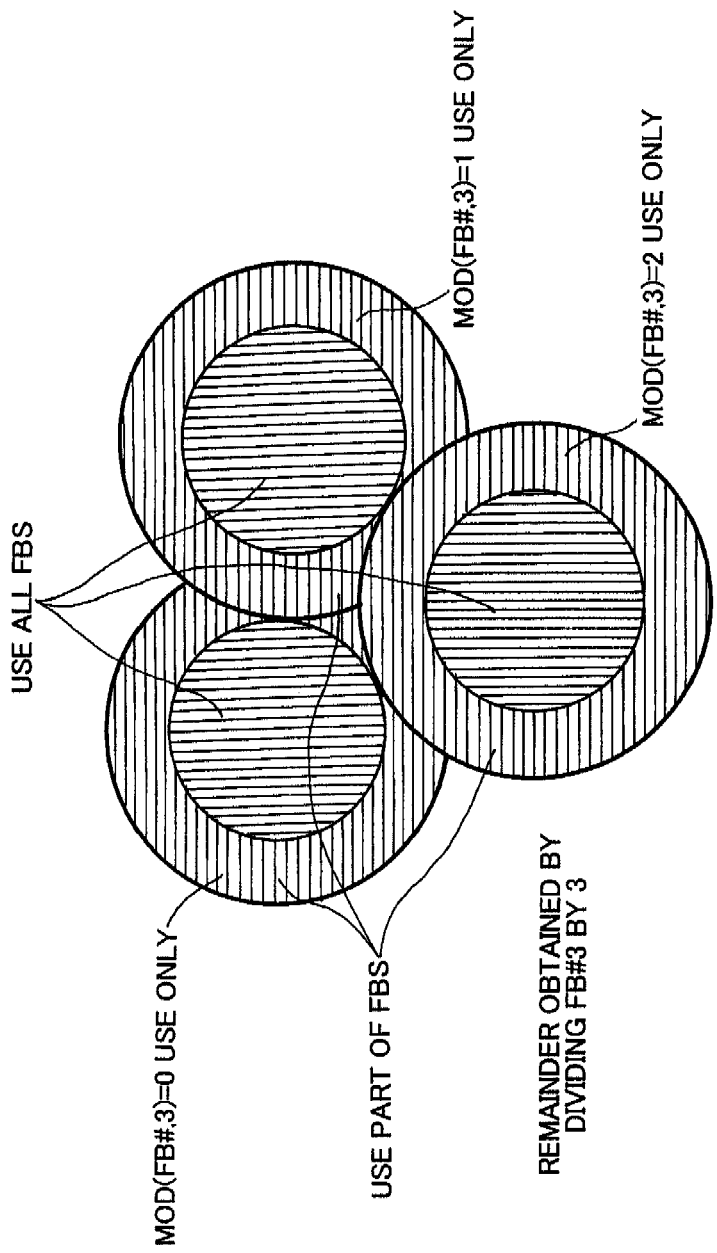
FIG. 3 is a view for explaining a conventional technique.
Figure 4:
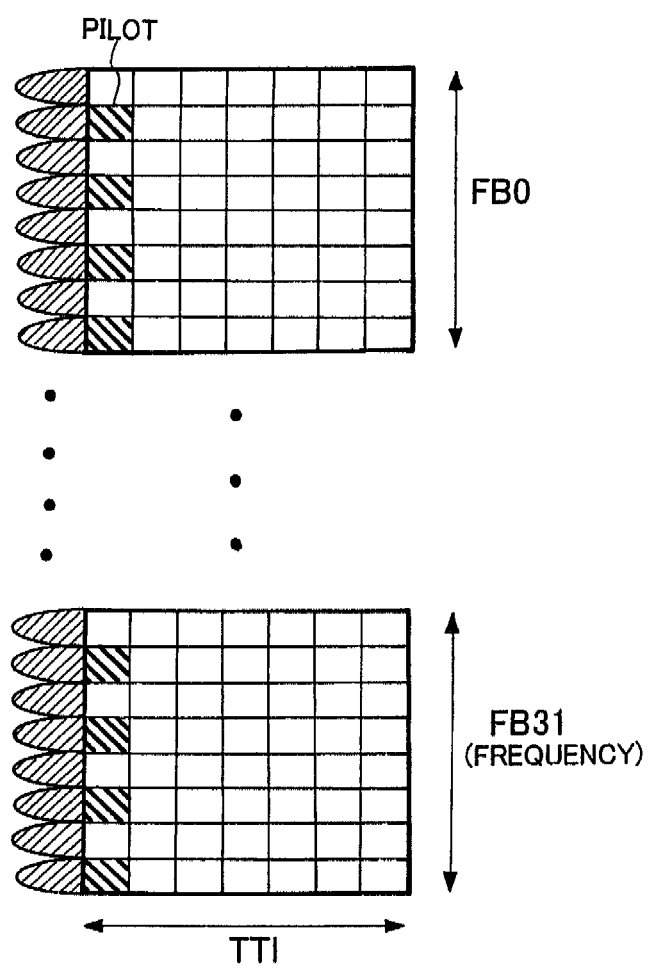
FIG. 4 is a view showing a frequency block.
Figure 5:
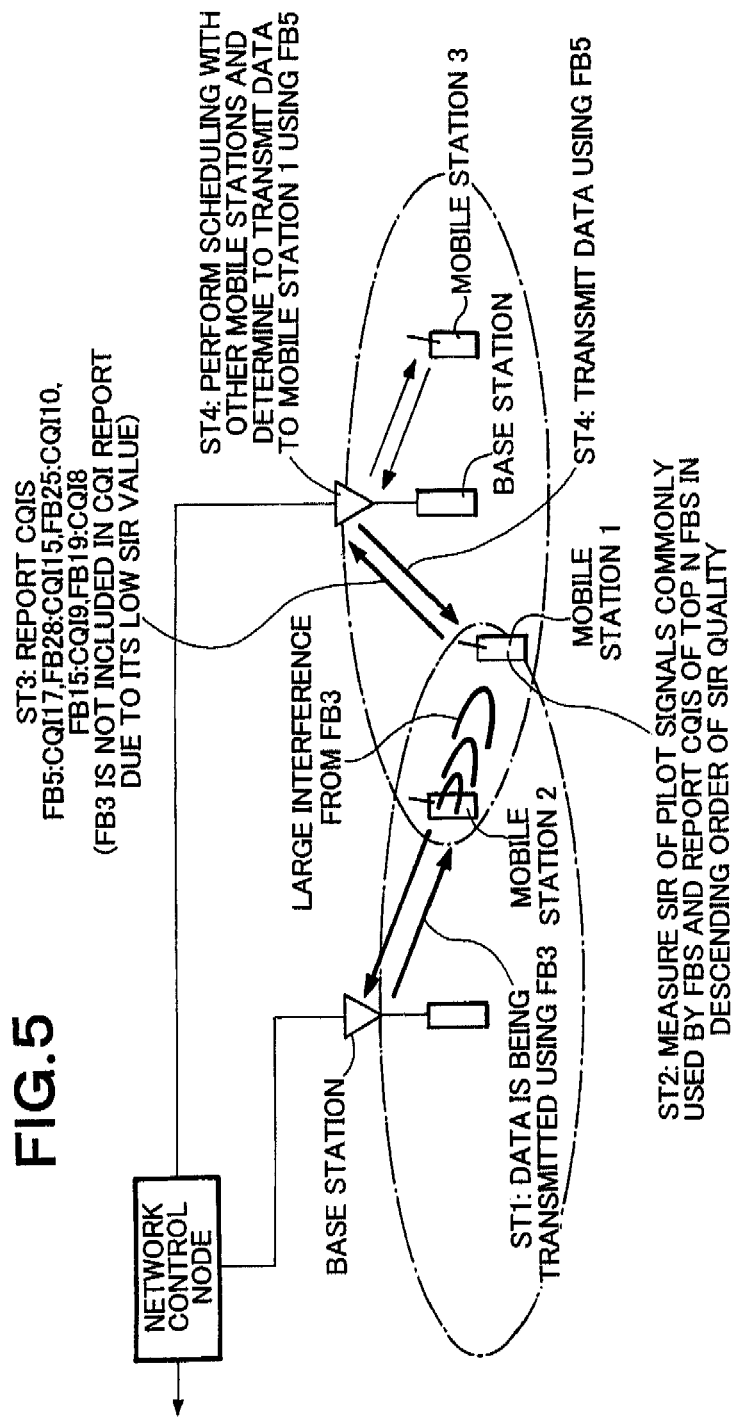
FIG. 5 is a view showing typical CQI transmission.
Figure 7:
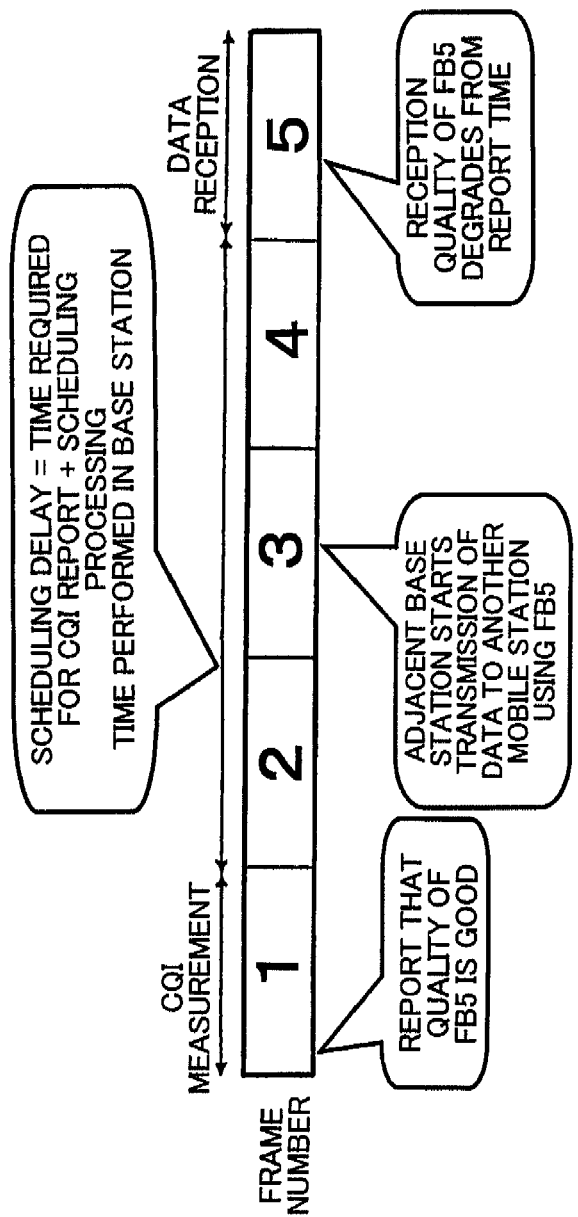
FIG. 7 is a view for explaining scheduling delay.

In the system shown in FIG. 8, there are a plurality of base stations 100 to 103 and a plurality of mobile stations 110 to 114 connected to any of the base stations 100 to 103. Each base station transmits a pilot signal every frame by multiplexing the pilot signal on a predetermined frequency carrier and subjected to multiplication with a base station-specific scrambling code. A group consisting of a predetermined number of frequency carriers as shown in FIG. 4 is referred to as an FB (Frequency block), and at least one pilot signal is multiplexed on one FB. The mobile station may be a fixed terminal that does not move. Further, one FB may include only one frequency carrier. The mobile station and base station realize the following functions according to control programs stored in their memories.

The mobile station transmits/receives to/from a connected base station (SBS: Serving Base Station) uplink/downlink control channels and downlink data channel and performs downlink high-speed packet transmission.

Each mobile station measures the average reception quality of pilot signals included in each FB that the SBS transmits and transmits signals (CQI: Channel Quality Indicator) representing the channel quality of the FBs on the uplink control channel. Unless otherwise specified in the embodiments described below, a generation method of the CQI is that a predetermined number (e.g., five) of FBs are selected in the descending order of the average reception quality of the pilot signals included in each FB, and FB numbers thereof and an index indicating the reception quality are reported to the SBS. The reception quality is calculated based on the SIR (signal-to-interference ratio) of each pilot signal. Alternatively, the reception quality may be calculated based on the reception power of each pilot signal, etc.

The SBS performs scheduling based on the reported CQI signal such that an FB whose channel quality is the best for a given mobile station is preferentially allocated to the given mobile station and transmits, on the control channel, a signal concerning a data transmission format required for reception processing, such as the FB to be allocated to each mobile station, data size, modulation method in the form of a downlink control signal. After a predetermined time has elapsed, the SBS transmits data on the data channel using the specified data transmission format.

Although, in the above description, the SBS always selects a mobile station based on the FB having the best channel quality, the scheduling method according to the present embodiments are not limited to this. For example, a scheduler called "proportional fairness" which selects the mobile station in the descending order of the instantaneous reception quality with respect to the average reception quality of each mobile station may be used for increasing fairness between the mobile stations in the system.

Further, a predetermined number of the FBs whose CQIs are to be reported are selected in the descending order of the reception quality in the above description, to which the embodiments of the present invention are not limited. Alternatively, however, an index indicating the reception quality of all FBs or a part of FBs specified by the SBS may be reported.

FIRST EMBODIMENT

A generation method of the CQI used in the first embodiment will be described using FIGS. 9, 10, and 11.

The first embodiment is featured in that the mobile station selects FBs whose CQI are to be reported with the channel quality for adjacent base stations taken into consideration. When a difference between the average reception power of the pilot signal transmitted from a given base station in the system, which is measured at predetermined cycles by the target mobile station, and pilot reception quality of the SBS falls within a predetermined adjacent base station set threshold, the given base station is regarded as the adjacent base station.

Figures 9, 10:
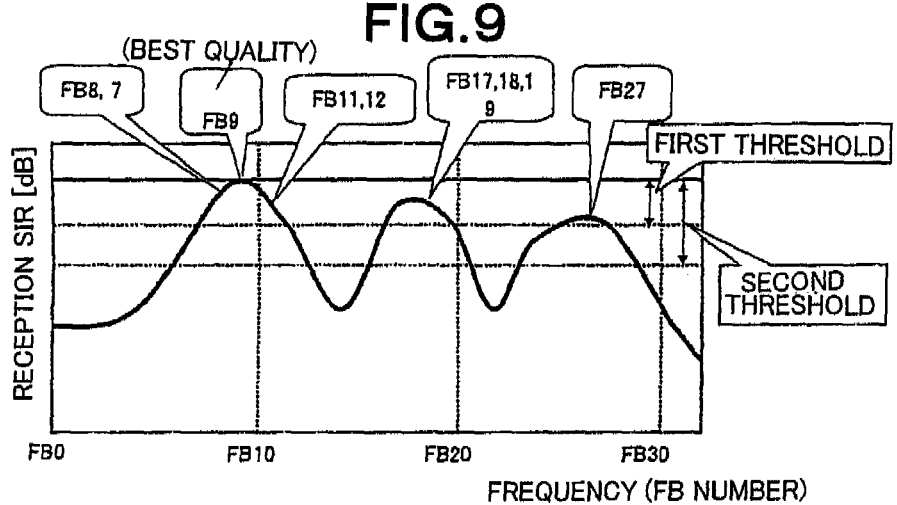
FIG. 9 is a view showing an example of a reception quality measurement result of a pilot signal.
FIG. 10 is a view showing an example of a selection method of an FB for transmitting a CQI report.

FIG. 9 is a view showing a result obtained by measuring the SIR of the pilot signal transmitted from the SBS for each FB. In this case, FB9 exhibits the highest reception SIR. Based on the measurement result, the mobile station selects FBs (FB7, FB8, FB11, FB12, FB17, FB18, FB19, FB27) whose reception SIRs fall within a predetermined threshold (first threshold) set based on the reception SIR of FB9 and arranges the selected FBs in the descending order of the reception SIR quality (FIG. 10). Further, the mobile station measures also the reception power of each pilot signal transmitted on each FB from adjacent base stations and converts the measurement result into an interference level using a conversion table shown in FIG. 11. In the conversion table, the smaller the reception power of the pilot signal is, i.e., the worse the channel quality is, the smaller the numerical value indicating the interference level becomes. The total sum of the interference level from all adjacent base stations to each FB is defined as the aggregate interference level to the FB. The mobile station selects a predetermined number N of FBs in the ascending order of the aggregate interference level and transmits the FB numbers thereof and their CQIs to the base station. When a plurality of FBs having the same aggregated interference level exist, the FB having a higher reception SIR of the pilot signal from the SBS is prioritized. When the number of FBs each having the reception SIR falling within the first threshold is smaller than the predetermined number, i.e., N, all the FBs having the reception SIRs falling within the first threshold are reported and, further, additional FBs are selected between the first and second thresholds to determine the FBs whose CQI are to be reported in the manner as described above until the number of FBs reaches the predetermined value.

By selecting the FBs and transmitting their CQIs, interference from the adjacent base stations can be reduced. This is because that when the adjacent base stations perform transmission to another mobile station using the same FB at the same timing, an FB having a poor channel quality is selected in this case, so that the interference power becomes smaller. Therefore, by selecting and transmitting the FB having a small interference between adjacent base stations and having good reception quality from the SBS, it is possible to reduce adjacent interference and to increase a throughput of the mobile station at the portion near the cell boundary, leading to an increase of a throughput of the entire system.

Figure 12:
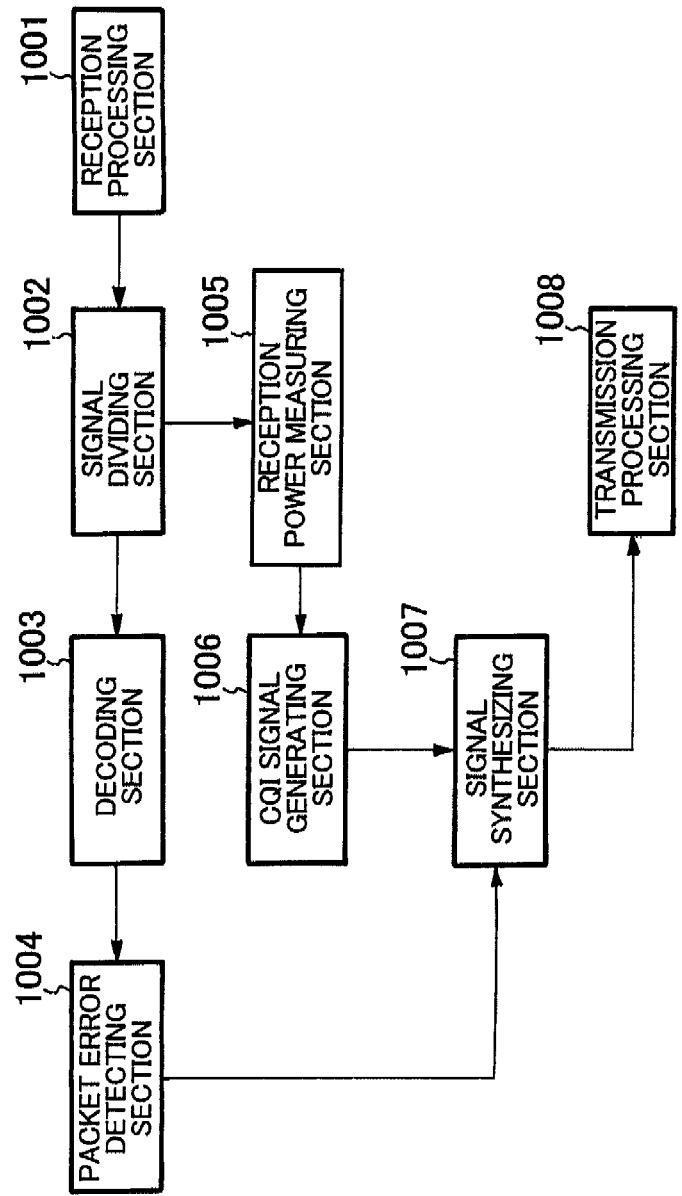
FIG. 12 is a configuration view of a mobile terminal in a first embodiment.

FIG. 12 is a view showing a configuration of the mobile station used in the first embodiment.

The mobile station used in the first embodiment includes a reception processing section 1001, a signal dividing section 1002, a decoding section 1003, a packet error detecting section 1004, a reception power measuring section 1005, a CQI signal generating section 1006, a signal synthesizing section 1007, and a transmission processing section 1008.

The reception processing section 1001 receives a signal at a predetermined timing and performs necessary reception processing such as elimination of a guard interval which is added to each symbol, FFT transformation, removal of a specific scrambling code. The signal dividing section 1002 divides the resultant signal into a pilot signal, a control channel signal, and a data channel signal, and transmits the pilot signal and other signals to the reception power measuring section 1005 and the decoding section 1003, respectively. Further, the reception processing section 1001 receives also a pilot signal from adjacent base stations at predetermined timings, performs the guard interval elimination, FFT transformation, specific scrambling code removal, and transmits the resultant signal to the reception power measuring section 1005.

The decoding section 1003 uses information of the control channel to decode data of the data channel. The packet error detecting section 1004 determines presence/absence of an error in the data decoded by the decoding section 1003 and transmits the determination result to the signal synthesizing section 1007.

The reception power measuring section 1005 measures the reception power of each pilot signal of the SBS and adjacent base stations and transmits the measurement results to the CQI signal generating section 1006. The CQI signal generating section 1006 selects the FBs whose CQI are to be reported according to the procedure described using FIGS. 9 to 11 and transmits the selected FBs and their CQIs to the signal synthesizing section 1007. The signal synthesizing section 1007 transmits the FBs and CQI information to the transmission processing section 1008 together with the ACK/NACK information of the packet in a multiplexed manner. The transmission processing section 1008 applies coding and modulation to the received signal and transmits the resultant signal to the SBS on the uplink control channel.

Figure 13:
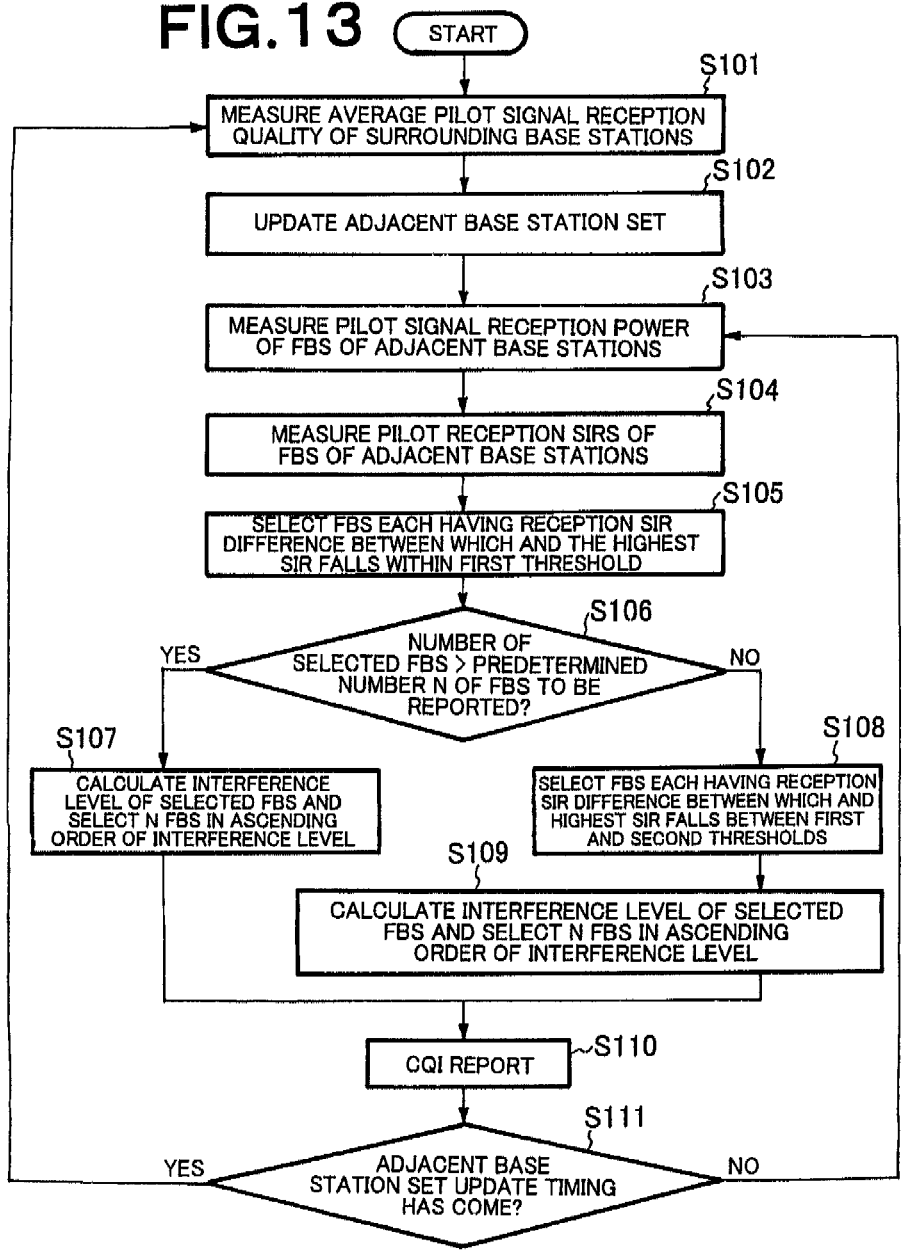
FIG. 13 is a flowchart showing an operation flow of the mobile station in the first embodiment.

FIG. 13 is a flowchart showing an operation flow according to which the mobile station determines the CQI signal to be transmitted.

The mobile station measures the average pilot signal reception quality of surrounding base stations (step S101) and sets base stations for which a difference between the pilot reception quality of the SBS and their respective average pilot signal reception quality falls within the adjacent base station set threshold as the adjacent base station set (step S102). Then, the mobile station measures the pilot signal reception power of each FB transmitted from the adjacent base station set (step S103), measures the pilot reception SIR of each FB transmitted from the SBS (step S104), and selects the FBs each having the reception SIR the difference between which and the highest SIR falls within the first threshold (step S105). When the number of the selected FBs is equal to or more than the predetermined number N at this time, the mobile station calculates the interference level of the adjacent base station for each FB based on the table of FIG. 11 and measured reception power values, selects the number less than N of FBs in the ascending order of the aggregate interference level thereof (step S107), and reports the selected FBs as an index and their CQIs (step S110). At this time, the index of the CQI is calculated from the pilot reception SIR from the SBS and table of FIG. 6.

When the number of selected FBs is less than the predetermined number N, for example, when the number of selected FBs is 3 and predetermined number N is 5, the mobile station first reports the CQI of the three FBs. Further, in order to select another two, the mobile station selects the FBs each having the reception SIR the difference between which and the highest SIR falls between the first and second thresholds (step S108), calculates the aggregate interference level thereof as above, selects two FBs in the ascending order of the aggregate interference level (step S109), and reports an FB index including the five FBs in total (including the former three) and their CQIs (step S110).

The mobile station performs the above operation at a predetermined CQI reporting cycle. Further, when a predetermined adjacent base station set update timing has come, the mobile station measures the average pilot signal of the surrounding base stations and updates the adjacent base station set according to the procedure described above.

Figure 14:
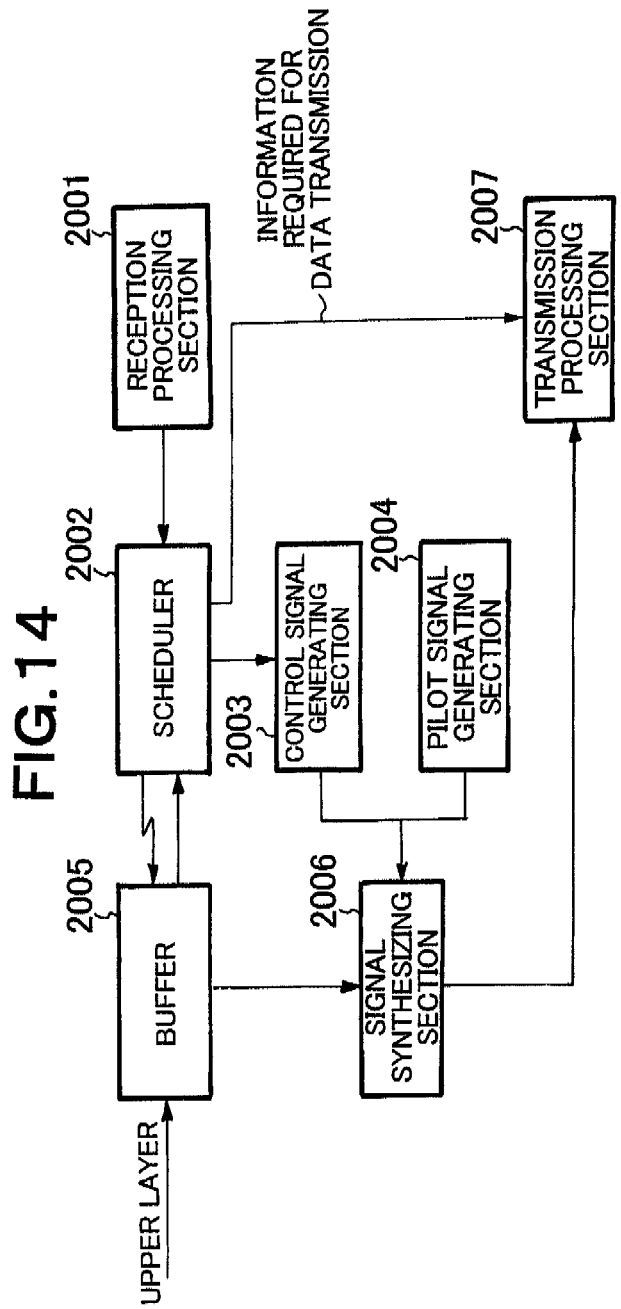
FIG. 14 is a configuration view of a base station in the first embodiment.

FIG. 14 is a view showing a configuration of the base station used in the first embodiment.

The base station includes a reception processing section 2001, a scheduler 2002, a control signal generating section 2003, a pilot signal generating section 2004, a buffer 2005, a signal synthesizing section 2006, and a transmission processing section 2007.

The reception processing section 2001 receives control signals transmitted on the uplink from the mobile stations at a predetermined timing, performs guard interval elimination and the like for the control signals, and transmits the resultant signals to the scheduler 2002.

The scheduler 2002 determines the FB to be allocated to each mobile station, data block size, modulation method, and the like based on the CQI signals transmitted from respective mobile stations and the data amount in the buffer 2005 and transmits the determined information to the signal synthesis section 2006. At the same time, the scheduler 2002 reports the above information to the buffer 2005, and the buffer 2005 transmits data corresponding to the reported data block size to the signal synthesis section 2006. The pilot signal generating section 2004 generates a signal according to a predetermined pilot signal pattern and transmits the generated signal to the signal synthesis section 2006. Further, the scheduler 2002 transmits information required for data communication including FBs, mobile stations, and the like to the transmission processing section 2007.

The signal synthesis section 2006 multiplexes the pilot signal, and the control signal and data destined to the target mobile stations on respective channels for transmission to the transmission processing section 2007. The transmission processing section 2007 performs necessary processing such as IFFT, guard interval addition before transmission.

Figure 15:
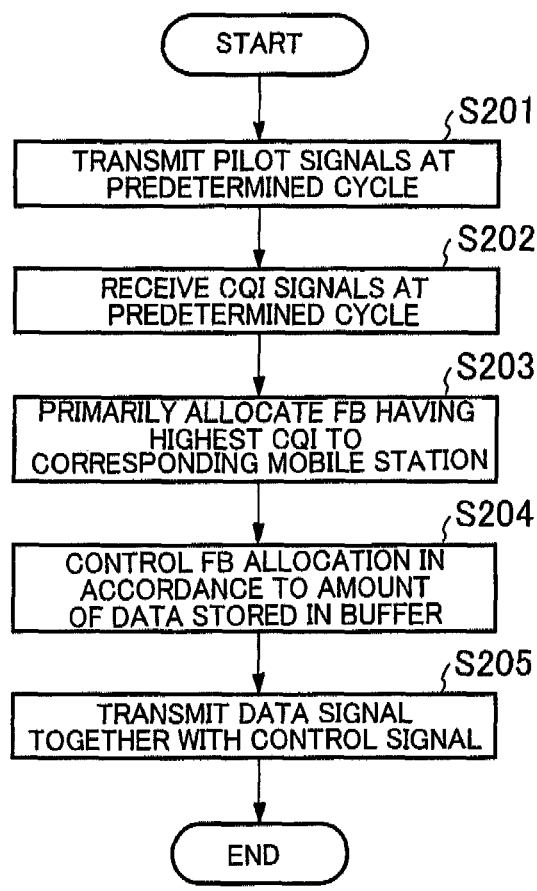
FIG. 15 is a flowchart showing an operation flow of the base station in the first embodiment.

FIG. 15 is a flowchart showing an operation flow of the base station in the first embodiment.

The base station transmits pilot signals of a predetermined pattern at a predetermined cycle (step S201), receives CQI signals transmitted from respective mobile stations connected thereto (step S202), and primarily allocates an FB having the highest CQI for a mobile station to the mobile station (step S203). Thereafter, the base station compares the amount of data that can be transferred by the total number of FBs primarily allocated to the respective mobile stations with the amount of data destined to the respective mobile stations which have been stored in the buffer 2005 and, based on the comparison result, performs control of FB allocation in accordance with the amount of data stored in the buffer (step S204). Specifically, for example, an FB primarily allocated to a mobile station to which excessive number of FBs has been allocated is reallocated to another mobile station for which the FB exhibiting the second-highest CQI. After that, the base station determines data block size to be transmitted on the allocated FB and modulation method and transmits data together with a control signal reporting the determined information to respective mobile stations (step S205).

As described above, according to the present embodiment, the mobile station can report FBs each experiencing a low interference level from the adjacent base stations in a preferential manner when transmitting to the SBS the CQIs of the FBs as candidates for use in data transmission. Therefore, when each base station selects and transmits a satisfactory FB for respective mobile stations based on the reported CQI, even if the adjacent base station uses the same FB at the same timing to another mobile station, an interference level from the adjacent base station becomes small. As a result, it is possible to reduce interference between adjacent base stations in the entire system, thereby increasing a throughput of the mobile station at the portion near the cell boundary and a throughput of the entire system.

As described above, according to the present invention, even if the adjacent base stations perform transmission using the same frequency block at the same timing to different mobile stations, it is possible to realize allocation of frequency blocks capable of reducing inter-cell interference as much as possible.

Although the mobile station measures the average reception quality of the pilot signals from the surrounding base stations to thereby determine the adjacent base station set, the present invention is not limited to this configuration. For example, the mobile station may transmit the measurement result of the average reception quality of the pilot signals from the surrounding base stations. In this case, the base station determines the adjacent base station set based on the received measurement result. Alternatively, the adjacent base stations may previously be determined as system information specific to each base station and may be reported as annunciation information.

SECOND EMBODIMENT

The configurations of the mobile station and base station in the second embodiment are the same as those in the first embodiment, and descriptions thereof will be omitted. The second embodiment differs from the first embodiment in the following points.

Figure 16:
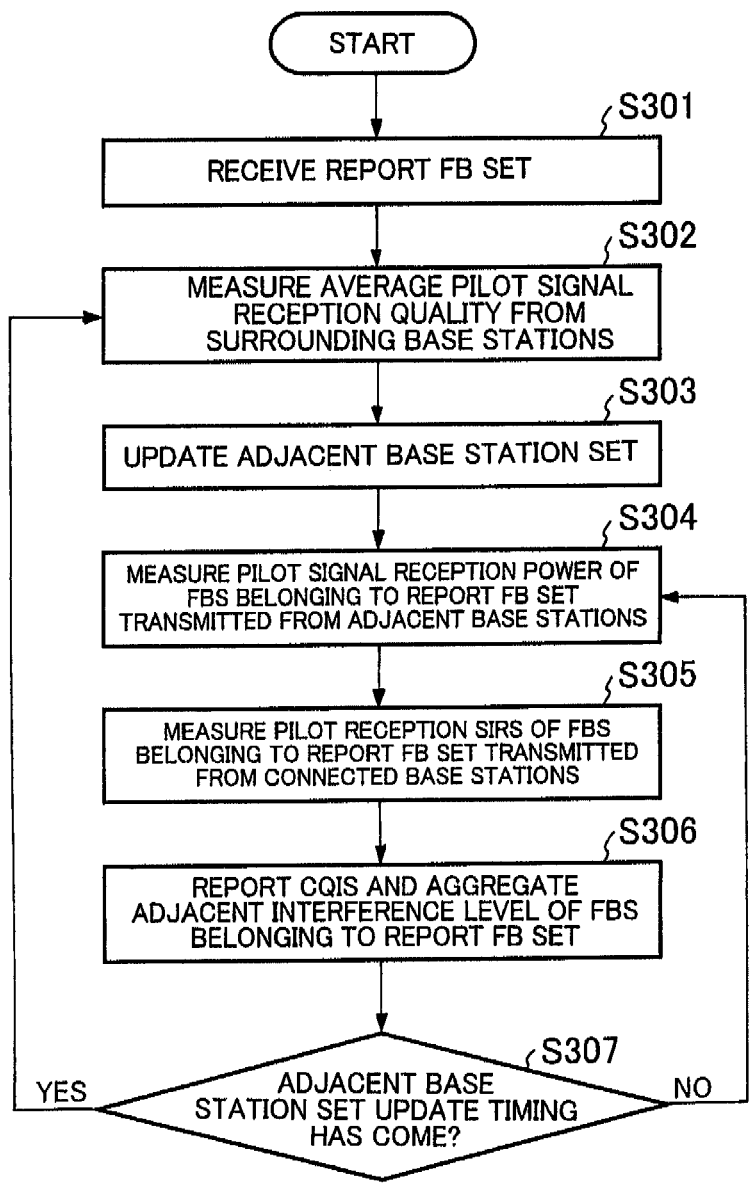
FIG. 16 is a flowchart showing an operation flow of the mobile station in a second embodiment.

The mobile station in the first embodiment selects, from all FBs, a predetermined number of FBs to be reported in the descending order of the reception SIR quality. On the other hand, as shown in the flowchart of FIG. 16, the mobile station in the second embodiment previously receives a report FB set listing the FBs whose CQIs are to be reported from the base station (step S301). The mobile station measures the reception SIRs of the pilot signals from the SBS for the FBs belonging to the report FB set (step S305) to obtain CQIs and calculates interference level from the adjacent base stations and aggregate interference level according to the procedure described in the first embodiment (step S304). After that, the mobile station reports the CQIs and aggregate interference level of the respective FBs belonging to the report FB set (step S306).

In the base station in the second embodiment, the scheduler performs scheduling of the mobile stations using the CQIs and aggregate interference level. Although a scheduling method is not limited to a specific one in the present invention, for example, a value having a positive correlation with the CQI and a negative correlation with the aggregated interference level such as a value (hereinafter, referred to as "modified CQI") obtained by multiplying the inverse number of the aggregate interference level with the CQI is used in place of the CQI in the flowchart of FIG. 15. As described above, the larger the CQI value is, the better the reception quality from the SBS becomes, and the smaller the aggregate interference level value, the smaller the interference power from the adjacent base stations. Therefore, the larger the modified CQI value, the better the reception quality from the SBS becomes and the smaller the interference level from the adjacent base stations. The base station performs scheduling such that an FB having a large modified CQI value for a given mobile station is preferentially allocated to the given mobile station.

As described above, according to the present embodiment, the base station can obtain not only the reception SIRs of the FBs belonging to the report FB set but also information of the interference level from the adjacent base stations. Therefore, when the scheduler in the base station selects and transmits an FB having a low interference level from the adjacent base station, even if the adjacent base stations perform data transmission using the same FB at the same timing to different mobile stations, the interference power becomes smaller and therefore a throughput of the mobile station at the portion near the cell boundary is increased, with the result that a throughput of the entire system is increased.

Although, in the present embodiment, the mobile station reports the CQIs and interference level of some FBs specified by the base station, the present invention is not limited to this configuration. For example, the mobile station may report the CQIs and aggregate interference level of all the FBs. Alternatively, the mobile station may select a predetermined number of FBs in the descending order of the CQI level and report the CQIs and aggregate interference level corresponding to the selected FBs.

Figure 17:
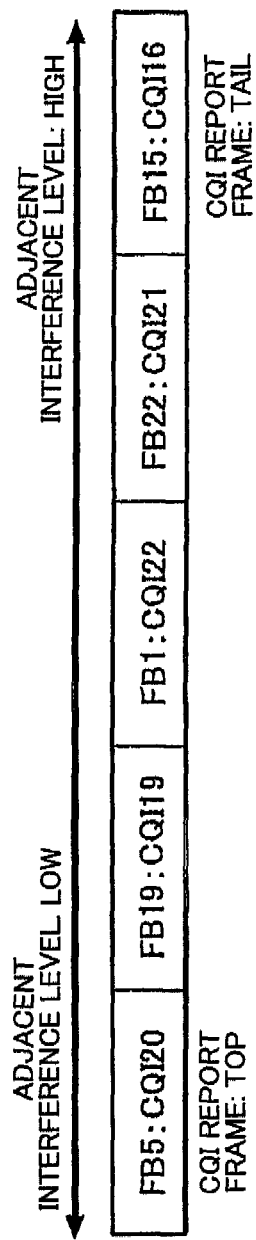
FIG. 17 is a view showing the order of the magnitude of an interference level in the frame for notifying FBs.

Further, although, in the present embodiment, the aggregate interference level is reported to the base station as a numerical value, the present invention is not limited to this configuration. For example, as shown in FIG. 17, by arranging the order of the FBs to be reported in the ascending order of the aggregate interference level for transmission, the relative magnitude of the aggregate interference level can be reported to the base station.

Further, although, in the present embodiment, the CQI and aggregate interference level of the FB are reported in the form of an absolute value, the present invention is not limited to this configuration. For example, the following configuration may be adopted. That is, the base station previously reports a predetermined reference FB to the mobile station. The mobile station reports the CQI and aggregate interference level of the reference FB and, for the FBs other than the reference FB, reports only the difference with the CQI and aggregate interference level of the reference FB.

THIRD EMBODIMENT

FIG. 18 shows a relationship between the base stations and mobile stations in the third embodiment, and FIG. 19 shows a sequence step between the base stations and mobile stations. As shown in FIGS. 18 and 19, the present embodiment is featured in that the base station performs scheduling to determine the FBs to be used in data transmission and reports the determined FBs to the adjacent base stations and connected mobile stations as annunciation information.

A mobile station 211 connected to a base station 201 measures the reception quality of the respective FBs, selects five FBs in the descending order of the CQI level, and reports the CQIs to the base station 201 using the uplink control channel. The base station 201 determines to perform data transmission using FB3 to the mobile station 211 based on the CQI level and reports on the report channel that the FB3 is used for data transmission.

Here, it is assumed that a mobile station 212 connected to a base station 202 adjacent to the base station 201, which periodically receives the report channel of the surrounding base stations, receives information indicating that the FB3 is used (reserved) by the base station 201. When the mobile station 212 selects five FBs whose CQIs are to be reported in the descending order of the reception quality based on the reception quality of the pilot signals transmitted using the FBs by the base station 202, the mobile station 212 excludes the reserved FB3. Accordingly, when the base station 212 (202?) selects the FB to be used for transmission based on the reported CQIs, the FB3 which is reserved by the adjacent base station (base station 201) is excluded, thereby avoiding interference between adjacent base stations. As a result, it is possible to increase a throughput of the mobile station at the portion near the cell boundary, leading to an increase of a throughput of the entire system. The reserved FB is preferably reported on a common channel, which allows mobile stations connected to the adjacent base stations to know the reserved information.

Although, in the above description, the base station 201 reports only the reserved FB as the annunciation information, information concerning the use time (use start time, use end time, or use duration time) of the reserved FB may be reported together with the reserved FB. This prevents a mobile station that has received the annunciation information from reporting the CQI of the reserved FB during the time zone reported by the use time information.

The base station 201 need not report the reserved FB information for all FBs to be used. For example, the base station 201 may report the reserved FB information for only FBs used for mobile stations transmitting a service with a high real-time demand (service with high QoS) or a service with high priority set by a network.

Further, like the base station 201, the base station 202 may report an FB to be used for a mobile station connected thereto as a reserved FB.

Although the base stations 201 and 202 transmit pilot signals at a predetermined cycle, the sequence diagram of FIG. 19 shows only one cycle.

The timing control from when the mobile station 211 transmits a signal in ST2 to when the base station transmits data in ST8 is made as follows.

In ST4, the base station 201 transmits the annunciation information of the reserved FB and, at the same time, activates a not-shown timer provided therein. After a predetermined time has elapsed, the base station 201 starts data transmission to the mobile station 201 in ST8. The predetermined time is a system parameter previously determined in consideration of the average time required for CQI report and scheduling performed in the base station 202 and mobile station 212.

Alternatively, as another example of the timing control, the base station 201 includes information indicating a predetermined timing in a common clock of the entire system in ST4. The mobile station 212 receiving the annunciation information in ST4 does not include the reserved FB specified in ST4 in the CQI report to be transmitted to the base station 202 until the predetermined timing has passed. In ST8, the base station 201 transmits data at a clock timing specified in ST4.

Alternatively, as still another example of the timing control, the base station 201 includes information indicating timing offset in ST4. Upon receiving the information in ST4, the mobile station 212 activates a not-shown timer provided therein and does not include the reserved FB specified in ST4 in the CQI report to be transmitted to the base station 202 during the specified time offset. The base station 201 transmits the annunciation information and activates a not-shown timer provided therein in ST4, and after the specified timing offset has elapsed, transmits data to the mobile station 201 in ST8. The timing offset may be determined by the base stations or may previously be set as a system parameter.

The operation in the present embodiment will be described in detail using block diagrams of the mobile station and base station and flowcharts.

FIG. 20 shows a configuration of the mobile station, and FIG. 21 is a flowchart showing an operation flow when the mobile station reports the CQI.

As in the case of the mobile station of the first embodiment, the mobile station in the present embodiment measures the average pilot signal of the surrounding base stations at a predetermined timing (step S401), updates the adjacent base station set (step S402), and receives the annunciation information transmitted from the base station in the adjacent base station set to obtain the reserved FB information (step S403). Further, the mobile station measures the reception SIRs of the FBs from the SBS (step S404) and selects a predetermined number N of FBs in the descending order of the reception SIR quality. If, at this time, the reserved FB specified in the annunciation information is selected, the mobile station ignores this FB and selects an FB of quality rank next to the reserved FB (step S405). Then, the mobile station reports the numbers of the selected FBs and their CQIs to the base station (step S406). The mobile station repeats the above operation to report the CQI.

Figure 23:
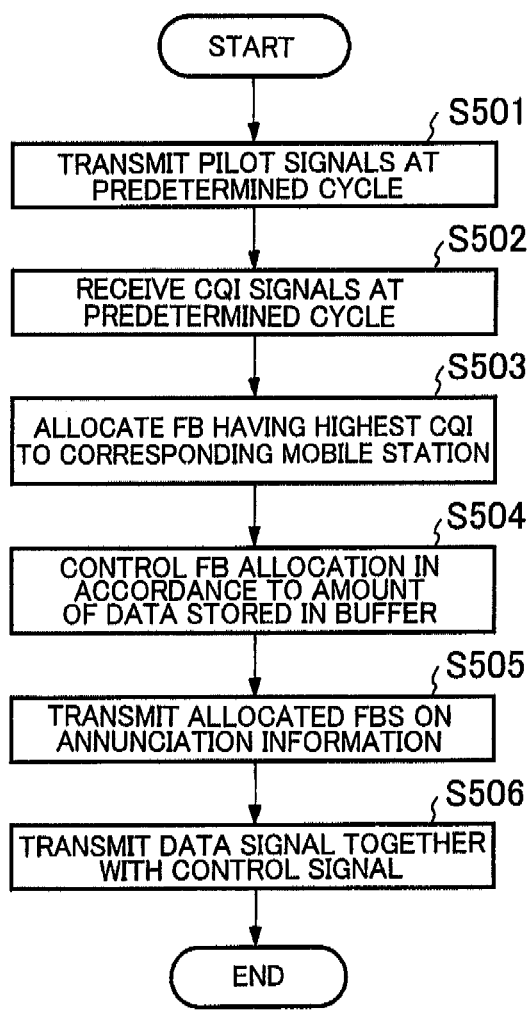
FIG. 23 is a flowchart showing an operation flow of the base station in the third embodiment.

FIG. 22 shows a configuration of the base station, and FIG. 23 is a flowchart showing an operation flow of data transmission performed by the base station. The scheduler transmits information (coding rate, multivalued number, FB, timing) required for data transmission and reserved FB information to be transmitted on a common control channel (third and fourth embodiments) or individual control channel (fifth embodiment) to the transmission processing section.

The operation of the base station in the present embodiment is substantially the same as that in the first embodiment except for step S505, where allocation information of FBs is transmitted as the annunciation information after the scheduling.

As described above, according to the third embodiment, the base station performs scheduling based on the reported CQIs to prevent the adjacent base stations from using reserved FB, thereby avoiding interference between adjacent base stations. As a result, it is possible to increase a user throughput of the mobile station at the portion near the cell boundary, leading to an increase of a throughput of the entire system.

As described above, according to the present invention, it is possible to realize frequency block allocation capable of preventing adjacent base stations from using the same frequency blocks at the same timing.

FOURTH EMBODIMENT

In the above third embodiment, the mobile station selects a predetermined number of FBs in the descending order of the reception quality and reports their CQIs; while in this fourth embodiment, the mobile station reports the CQIs of all FBs or FB set previously specified by the base station. Therefore, although the mobile station excludes the reserved FB when selecting the FBs whose CQIs are to be reported, the mobile station in this embodiment transmits an NA (Non-Available) as an index indicating that the CQI of the reserved FB is not available, as shown in FIG. 24.

The base station determines that the Non-Available FB is used by the adjacent base station and does not use the Non-Available FB for data transmission to a mobile station connected thereto. The scheduler has a memory (not shown) for storing the NA information and manages the information.

FIFTH EMBODIMENT

Figure 25:
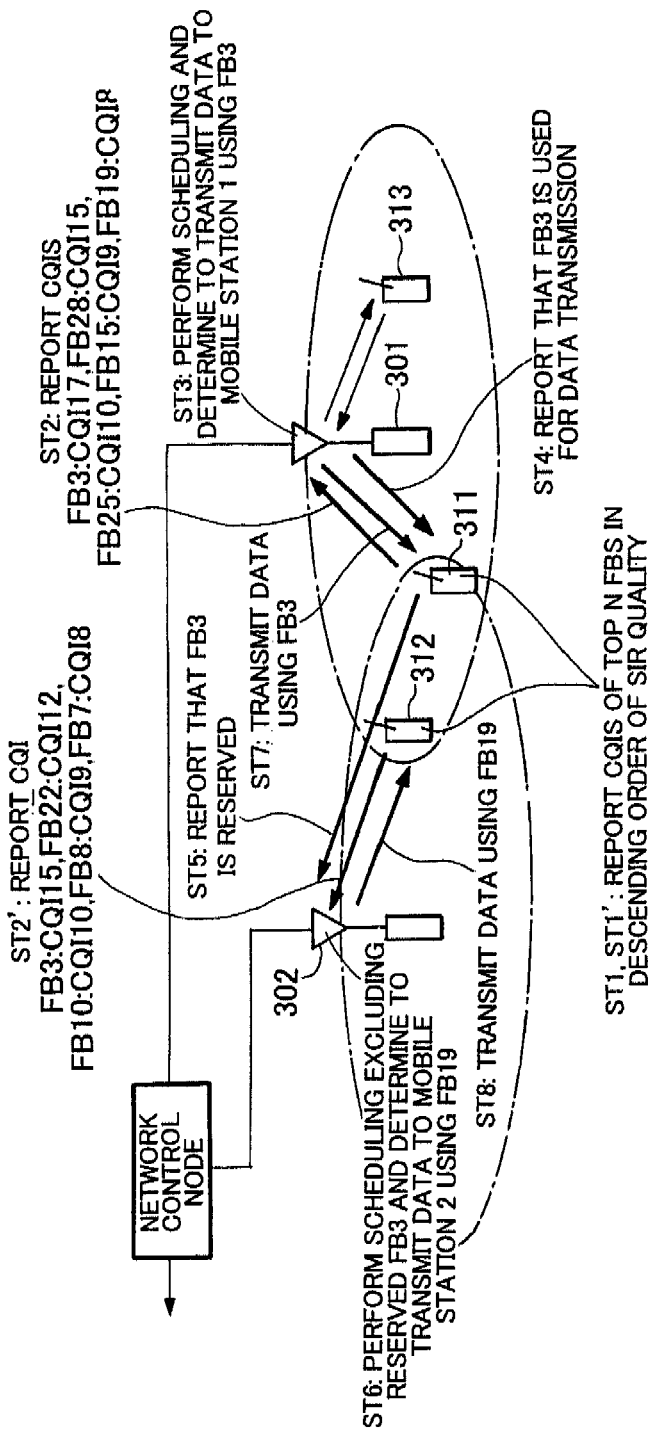
FIG. 25 is a view for explaining characteristics of a fifth embodiment.

FIG. 25 shows a relationship between the base stations and mobile stations in the fifth embodiment, and FIG. 26 is a sequence step between the base stations and mobile stations. In the present embodiment, the base station does not transmit the FBs to be used for data transmission as the annunciation information like the third and fourth embodiments, but, as shown in FIGS. 25 and 26, a mobile station 311 receives and stores FB information to be used for data transmission and repots the information to an adjacent base station 312 on the uplink control channel. Upon receiving the information, the adjacent base station 312 determines that the reported FB is reserved by the base station 301 and does not use this FB for data transmission to a mobile station connected thereto. Thus, it is possible to prevent the adjacent base stations from using the same FB. As a result, as in the case of the third and fourth embodiments, it is possible to increase a throughput of the mobile station at the portion near the cell boundary, leading to an increase of a throughput of the entire system.

Also in the present embodiment, the following three patterns are available as in the case of the third embodiment.

The first pattern is that the base station 301 transmits the FB information in ST4, activates a timer provided therein and, after a predetermined time has elapsed, transmits data in ST7.

The second pattern is that the base station 301 transmits transmission timing information indicating a predetermined timing in a common clock of the entire system in addition to the FB information in ST4 and ST5. The base station 302 does not use the reserved FB in data transmission at the specified transmission timing (ST8). The base station 301 transmits data at the transmission timing (ST7) specified in ST4.

The third pattern is that the base station 301 transmits timing offset information in addition to the FB information in ST4 and ST5. The base station 302 does not use the reserved FB from the moment that the base station 302 receives the FB information in ST5 to the end of the timing offset period. The base station 301 transmits data (ST7) after the timing offset period has elapsed from the transmission in ST4.

FIG. 27 shows a configuration of the mobile station in the present embodiment. The signal dividing section extracts reserved FB information and transmits the reserved FB information to the transmission processing section for transmitting the reserved FB information to the adjacent base stations.

The mobile station 311 may report, in addition to the reserved FB information, information concerning the QoS or priority of a service being received to the base station 302. The base station 302 may determine whether to use or not to use the reserved FB based on the QoS or priority information.

The base station 301 may specify whether or not to make the mobile station 311 report the reserved FB information to the adjacent base stations. That is, only when the QoS or priority of a service providing to the mobile station 311 is high, the base station 301 makes the mobile station 311 report the reserved FB information to the adjacent base stations; otherwise, does not make it so.

The adjacent base station 302 may transmit reportable service level information such as QoS level or priority information as annunciation information. The mobile station 311, with respect to which the base station 302 serves as an adjacent base station, receives the reportable service level information. Then, only when the level of the QoS or priority of a service being received is more than a specified service level, the mobile station 311 may report the reserved FB information to the base station 302.

The present invention may be applied to an uplink radio communication system in which the base station performs scheduling and reports available radio resources (FB, transmission time, etc.) to respective mobile stations and the mobile stations perform data transmission according to the radio resources. That is, the mobile station transmits information concerning the radio resources that the base station allows the mobile station to use to the adjacent base stations, and the adjacent base stations receiving the information do not use the reported radio resources for a mobile station connected thereto, thereby reducing inter-cell interference on the uplink.

Further, the present embodiment may be applied to a radio communication system using a common channel on the uplink in which a common frequency band is used between adjacent cells. Since a common channel is used, the base station performs scheduling concerning transmission timing of the mobile station or FB to be used and reports the transmission timing or available FBs to respective mobile stations; and the mobile station performs transmission according to the reported information. At this time, before the data transmission, the mobile station reports the reported transmission timing or information concerning available FB to the adjacent base stations on the uplink control channel. The adjacent base stations do not use the reported FB at the reported transmission timing for a mobile station connected thereto, thereby reducing inter-cell interference on the uplink.

SIXTH EMBODIMENT

FIG. 28 shows a relationship between the base stations and mobile stations in the sixth embodiment, and FIG. 29 shows a sequence step between the base stations and mobile stations. In the present embodiment, as shown in FIGS. 28 and 29, a mobile station 411 reports the CQI information to be reported to a base station 401 also to an adjacent base station 402. With this configuration, the base station 402 can grasp an FB having a satisfactory channel quality for the mobile station 411 and thereby can estimate an FB that the base station 401 is likely to allocate to the mobile station 411. Thus, when performing scheduling of a mobile station connected thereto, the base station 402 does not use such an FB to thereby reduce interference with the adjacent base stations.

In the scheduling performed in the adjacent base station 402, the base station 402 allocates mobile stations that have reported the best CQIs for respective FBs to corresponding FBs based on the CQIs reported from mobile stations connected thereto. After that, based on the data storage amount in buffers of the respective mobile stations, the base station 402 reduces the number of allocated FBs for the mobile station to which excessive number of FBs has been allocated. In this reduction of the number of FBs, the base station 402 reduces, in a preferential manner, the FB exhibiting satisfactory channel quality in the CQI reported by the mobile station 411. Accordingly, the adjacent base station 402 can increase the probability that the FB that is likely to be used for data transmission in the mobile station 411 is not allocated to the mobile station connected to the base station 411, thereby reducing interference from the adjacent base station 402 to the mobile station 411.

FIG. 30 shows a configuration of the mobile station in the present embodiment. The CQI signal generated in the CQI signal generating section is transmitted from the transmission processing section to both the connected base station and adjacent base station. At this time, a single channel received by both the base stations or different channels from each other may be used to transmit the CQI signal to the respective base stations.

FIG. 31 shows a configuration of the base station in the present embodiment. The reception processing section receives the CQI signal from a mobile station connected thereto and CQI signal from a mobile station connecting to the adjacent base station and transmits them to the scheduler.

As in the case of the fifth embodiment, the base station may determine whether to perform or not to perform the CQI report to the adjacent base station based on the QoS or priority information of a service being received by the mobile station.

SEVENTH EMBODIMENT

A generation method of the CQI used in the seventh embodiment will be described using FIGS. 9, 12, and 32.

The seventh embodiment is featured in that the mobile station selects the FBs whose CQI are to be reported in consideration not only of the SIR (signal-to-interference ratio) of a signal transmitted from a connected base station, but also of the signal power intensity.

As described in the first embodiment, FIG. 9 is a view showing a result obtained by measuring the SIR of the pilot signal transmitted from the SBS for each FB. In this case, FB9 exhibits the highest reception SIR. As in the case of the first embodiment, the mobile station selects FBs (FB7, FB8, FB11, FB12, FB17, FB18, FB19, FB27) whose reception SIRs fall within a predetermined threshold (first threshold) set based on the reception SIR of FB9 and arranges the selected FBs in the descending order of the reception SIR quality. Further, the mobile station measures also the signal power intensity of each FB, selects a predetermined number N of FBs in the descending order of the signal power intensity and transmits the numbers of the FBs and their CQIs to the base station. When a plurality of FBs having the same signal power intensity exist, the FB having a higher reception SIR is prioritized. When the number of FBs each having the reception SIR falling within the first threshold is smaller than the predetermined number, i.e., N, all the FBs having the reception SIRs falling within the first threshold are reported and, further, additional FBs are selected between the first and second thresholds to determine the FBs whose CQI are to be reported in the manner as described above until the number of FBs reaches the predetermined value.

By selecting the FBs and transmitting their CQIs, data transmission can be made using an FB having more satisfactory channel quality. The reason is as follows. In packet transmission, data transmission occurs in a burst manner, so that an interference power in adjacent cells varies in a burst manner. Accordingly, the SIR calculated based on the interference power varies in a burst manner. Thus, even if the FBs having satisfactory SIRs are selected and their CQIs are reported, the interference power abruptly increases at the timing of data transmission using the FB selected based on the CQI report, which may decrease the SIR. However, the signal power intensity for own cell varies with some degree of correlation, so that by selecting the FB having higher signal power intensity for the own cell, it is possible to increase the probability that the FB having a higher signal power intensity, i.e., a satisfactory SIR can be selected stably. As a result, it is possible to increase a throughput of the mobile station at the portion near the cell boundary largely affected by the interference power from the adjacent cells, leading to an increase of a throughput of the entire system.

The configuration of the mobile station used in the seventh embodiment is the same as that of the mobile station used in the first embodiment which is shown in FIG. 12. However, the following operation differs from the operation of the mobile station in the first embodiment.

In the mobile station of the first embodiment, the reception power measuring section measures the reception power of the pilot signals from the SBS and adjacent base stations and transmits it to the CQI signal generating section; while in the mobile station of seventh embodiment, the reception power measuring section measures the reception power of the pilot signals from the SBS and transmits it to the CQI signal generating section. The CQI signal generating section selects the FBs whose CQIs are to be reported in the procedure described above and transmits the selected FBs and their CQIs to the signal synthesizing section.

Figure 32:
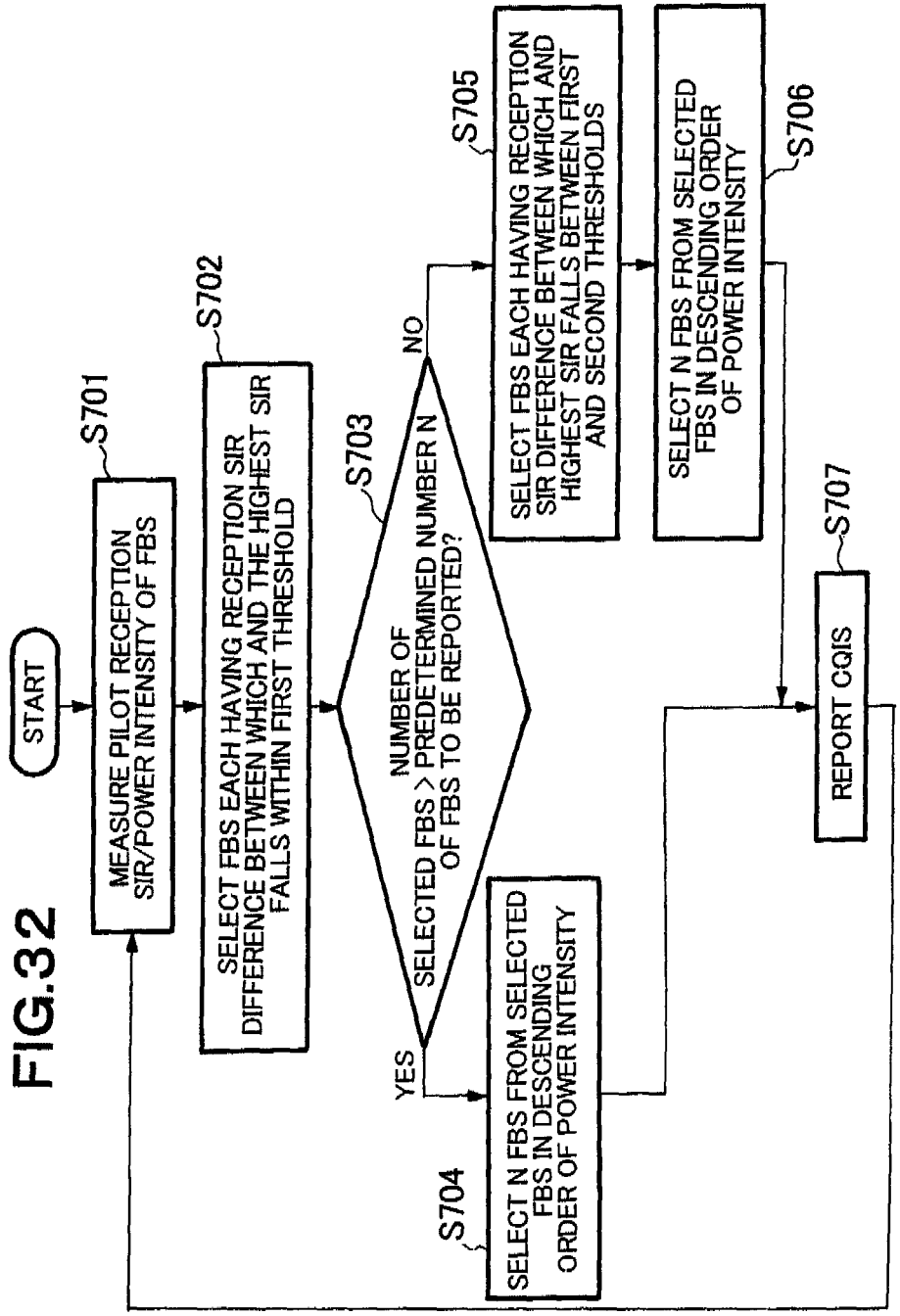
FIG. 32 is a flowchart showing an operation flow of the mobile station in a seventh embodiment.

FIG. 32 is a flowchart showing an operation flow according to which the mobile station determines the CQI signal to be transmitted.

The reception power measuring section in the mobile station measures the SIR and signal power intensity of each FB that the SBS transmits (step S701), and CQI signal generating section selects the FBs each having the reception SIR the difference between which and the highest SIR falls within the first threshold (step S702). When the number of the selected FBs is equal to or more than the predetermined number N at this time, the predetermined number N of FBs are selected from the FBs selected in step S702 in the descending order of the signal power intensity (step S704) and the FB index and CQIs are transmitted (step S707). At this time, the index of the CQI is calculated from the pilot reception SIR from the SBS and table of FIG. 6.

When the number of selected FBs is less than the predetermined number N, for example, when the number of selected FBs is 3 and predetermined number N is 5, the mobile station first reports the CQI of the three FBs. Further, in order to select another two, the mobile station selects the FBs each having the reception SIR the difference between which and the highest SIR falls between the first and second thresholds (step S705), then selects two FBs in the descending order of the signal intensity from the FBs selected in step S705 (step S706), and reports the FB index including the five FBs in total (including the former three) and their CQIs (step S707).

The configuration and operation flow of the base station in the seventh embodiment are the same as those in the first embodiment, and descriptions thereof will be omitted.

As described above, according to the present embodiment, the mobile station can report FBs each having a high signal power intensity for own cell in a preferential manner when transmitting to the SBS the CQIs of the FBs as candidates for use in data transmission. Thus, when each base station selects and transmits a satisfactory FB for respective mobile stations based on the reported CQI, even if the interference power from the adjacent cells significantly varies, data can be transmitted using an FB having a more satisfactory SIR. As a result, it is possible to increase a throughput of the mobile station at the portion near the cell boundary largely affected by the interference power from the adjacent cells, leading to an increase of a throughput of the entire system.

EIGHTH EMBODIMENT

The configurations of the mobile station and base station in the eighth embodiment are the same as those in the first embodiment, and descriptions thereof will be omitted. The mobile station and base station in the eighth embodiment differs from those in the seventh embodiment in the following points.

Figures 33, 34:
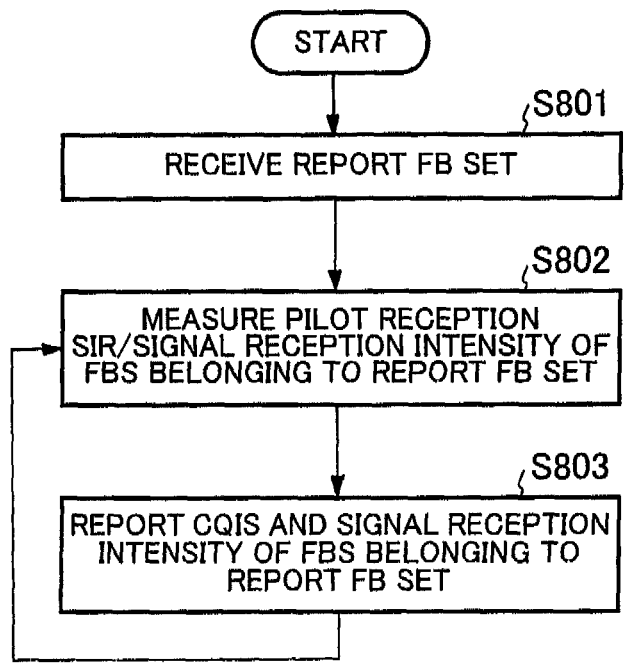
FIG. 33 is a flowchart showing an operation flow of the base station in an eighth embodiment.
FIG. 34 is a view showing an example of a signal power intensity level conversion table.

The mobile station in the seventh embodiment selects, from all FBs, a predetermined number of FBs to be reported in the descending order of the reception SIR quality and reports the FB index and CQIs. On the other hand, as shown in the flowchart of FIG. 33, the mobile station in the eighth embodiment receives a report FB set listing the FBs whose CQIs are to be reported from the base station (step S801). The mobile station measures, at the reception power measuring section, the reception SIRs and signal power intensity of the pilot signals that the SBS transmits using the FBs belonging to the report FB set (step S802) and reports the CQIs and signal power intensity level (FIG. 34) of the FBs belonging to the report FB set to the base station (step S803).

In the base station in the eighth embodiment, the scheduler performs scheduling of the mobile stations using the CQIs and signal power intensity. For example, in the operation flow of the base station shown in FIG. 15, a value obtained by weighting the CQI in proportion to the signal power intensity is used in place of the CQI. As described in the seventh embodiment, in a system where the interference power significantly varies, the CQI, i.e., a value based only on the SIR may significantly vary with time. However, the signal power intensity comparatively varies comparatively slowly in correlation with time. Thus, by using the signal power intensity for weighting to thereby increase the probability that an FB having a signal power intensity is selected, it is possible to increase the probability that an FB having a signal power intensity, i.e., FB having a high SIR is selected even if the interference amount is increased.

The scheduling method according to the present invention is not limited to those described above, and any other scheduling methods may be applied as long as they use an index having a positive correlation both with the CQI and signal power intensity.

As described above, according to the present embodiment, the base station can obtain not only the reception SIRs of the FBs belonging to the report FB set but also information concerning the signal power intensity. Therefore, when the scheduler in the base station selects and transmits an FB having a high signal power intensity, even if the interference amount from the adjacent base stations varies, a probability that an FB having a high signal power intensity for own cell, i.e., an FB having a satisfactory SIR is selected. As a result, it is possible to increase a throughput of the mobile station at the portion near the cell boundary where the interference amount significantly varies, leading to an increase of a throughput of the entire system.

Although, in the present embodiment, the mobile station reports the CQIs and signal power intensity of some FBs specified by the base station, the present invention is not limited to this configuration. For example, the mobile station may report the CQIs and signal power intensity of all the FBs. Alternatively, the mobile station may select a predetermined number of FBs in the descending order of the CQI level and report the CQIs and signal power intensity corresponding to the selected FBs.

Further, as in the case of in FIG. 17, by arranging the order of the FBs to be reported in the descending order of the signal power intensity for transmission, the relative magnitude of the signal power intensity can be reported to the base station.

Further, although, in the present embodiment, the CQI and signal power intensity of the FB are reported in the form of an absolute value, the present invention is not limited to this configuration. For example, the base station previously reports a predetermined reference FB to the mobile station. The mobile station reports the CQI and signal power intensity of the reference FB and, for the FBs other than the reference FB, reports only the difference with the CQI and signal power intensity of the reference FB.

The invention claimed is:

1. A radio communication method in which each of a plurality of base stations uses at least one of a plurality of frequency blocks to perform radio communication with at least one mobile station, wherein the plurality of base stations include, for each mobile station, a serving base station and one or more non-serving base stations, the method comprising:
   a step in which each of the plurality of base stations transmits pilot signals using each of the plurality of frequency blocks;
   a step in which the at least one mobile station measures a signal-to-interference ratio (SIR) of each of the pilot signals which are received from the serving base station;
   a first selection step in which the mobile station selects frequency blocks on the basis of the measured SIRs;
   a step in which the mobile station measures a reception power of each of the pilot signals which are received from non-serving base stations;
   a second selection step in which the mobile station selects frequency blocks from the frequency blocks selected in the first selection step, on the basis of the measured reception powers; and
   a step in which the mobile station transmits channel quality information, of each of the frequency blocks which are selected in the second selection step, to the base station.

2. The radio communication method according to claim 1, wherein in the first selection step, the mobile station selects frequency blocks whose SIRs are in a range between a maximum SIR and a value which is less than the maximum SIR by a predetermined amount.

3. The radio communication method according to claim 1, wherein in the second selection step, the mobile station converts the reception powers to interference levels, sums up the interference levels for each of the frequency blocks, and selects frequency blocks on the basis of the summed up interference levels in such a way that frequency blocks with lower summed up interference levels are preferentially selected.

4. The radio communication method according to claim 1, characterized by further comprising a step in which the serving base station performs scheduling of the mobile stations based on pieces of the channel quality information which are received from the mobile stations for which the serving base station serves.

5. A radio communication method in which each of a plurality of base stations uses one of a plurality of frequency blocks to perform radio communication with a mobile station, characterized by comprising:
   a step in which a first base station determines a frequency block used for radio communication with a first mobile station as a reserved frequency block;
   a step in which the first base station reports to a second base station the information concerning the reserved frequency block used for radio communication;

a step in which the second base station transmits signals using the plurality of frequency blocks;

a step in which a second mobile station measures a first reception quality of each of the respective signals from the second base station;

a step in which the second mobile station measures a second reception quality of each of the respective signals;

a step in which the second mobile station generates channel quality information of the frequency blocks based on the measured first reception quality of the respective signals and measured section reception quality of the respective signals;

a step in which the second mobile station selects a predetermined number of frequency blocks except the reserved frequency block based on the generated channel quality information; and a step in which the second mobile station transmits channel quality information of the frequency blocks selected to the second base station, wherein for each of the respective signals, both the first reception quality and the second reception quality are measured.

6. The radio communication method according to claim 5, characterized in that the first base station transmits the information concerning the reserved frequency block used for packet transmission as annunciation information.

7. The radio communication method according to claim 6, characterized in that the first base station determines to transmit the annunciation information based on the priority of packets transmitted to the first mobile station or service quality requirement.

8. The radio communication method according to claim 5, characterized in that the first base station reports to the first mobile station the information concerning the reserved frequency block used for packet transmission, and the first mobile station reports to the second base station the information concerning the reserved frequency block used for packet transmission.

9. The radio communication method according to claim 8, characterized in that the first mobile station reports to the second base station information concerning the priority of received packets or service quality requirement.

10. The radio communication method according to claim 8, characterized in that the second base station transmits information concerning the priority or service quality requirement, and the first mobile station determines to report the information concerning the reserved frequency block used for packet transmission based on the information.

11. A system in which each of a plurality of base stations uses at least one of a plurality of frequency blocks to perform radio communication with at least one mobile station, wherein the plurality of base stations include, for each mobile station, a serving base station and one or more non-serving base stations, wherein:

each of the plurality of base stations comprises means for transmitting pilot signals using each of the plurality of frequency blocks, and the at least one mobile station comprises:

means for measuring a signal-to-interference ratio (SIR) of each pilot signal which is received from the serving base station;

first selection means for selecting frequency blocks on the bases of the measured SIRs;

means for measuring a reception power of each of the pilot signals which are received from the non-serving base stations;

second selection means for selecting frequency blocks from the frequency blocks selected by the first selection means, on the bases of the measured reception powers; and means for transmitting channel quality information of each of the frequency blocks, selected by the second selection means, to the base station.

12. The system according to claim 11, wherein the first selection means selects frequency blocks whose SIRs are in a range between a maximum SIR and a value which is less than the maximum SIR by a predetermined amount.

13. The system according to claim 11, wherein the second selection means converts the reception powers to interference levels for each of the frequency blocks, and selects frequency blocks on the bases of the summed up interference levels in such a way that frequency blocks with lower summed up interference levels are preferentially selected.

14. The system according to claim 11, characterized in that the serving base station comprises means for performing scheduling of the mobile stations based on pieces of the channel quality information which are received from the mobile stations for which the serving base station serves.

15. A system in which each of a plurality of base stations uses one of a plurality of frequency blocks to perform radio communication with a mobile station characterized in that a first base station comprises:

means for determining a reserved frequency block used for radio communication with a first mobile station; and means for reporting to a second base station the information concerning the reserved frequency block used for radio communication with the first mobile station;

the second base station comprises:

means for transmitting signals using the plurality of frequency blocks to a second mobile station; and the second mobile station comprises:

means for measuring a first reception quality of each of the respective signals from the second base station;

means for measuring a second reception quality of each of the respective signals from the second base station;

means for generating channel quality information of the frequency blocks based on the measured first reception quality and measured second reception quality;

means for selecting a predetermined number of frequency blocks except the reserved frequency block based on the generated channel quality information; and means for transmitting channel quality information of the frequency blocks selected to the second base station, wherein for each of the respective signals, both the first reception quality and the second reception quality are measured.

16. A mobile station radio communication method in a system in which each of a plurality of base stations uses one of a plurality of frequency blocks to perform radio communication with a mobile station, characterized by comprising the steps of:

receiving information concerning a reserved frequency block from a first base station;

measuring reception quality of pilot signals that a second base station transmits using the frequency blocks;

generating channel quality information based on the reception quality and information concerning the reserved frequency block, said channel quality information not including channel quality information related to said reserved frequency block;

selecting a predetermined number of frequency blocks except the reserved frequency block based on the channel quality information generated; and reporting the channel quality information of the frequency blocks selected to the second base station.

17. A mobile station radio communication method in a system in which each of a plurality of base stations uses at least one of a plurality of frequency blocks to perform radio communication with a mobile station, comprising:

a step in which a first mobile station receives, from a first base station, information concerning a frequency block used for packet transmission destined to the first mobile station itself;

a step in which the first mobile station reports, to a second base station, the information concerning the frequency block used for packet transmission; and a step in which the second base station selects a frequency block for communication with a second mobile station from frequency blocks other than the frequency block used for packet transmission destined for the first mobile station based on the information reported from the first mobile station;

wherein the first mobile station is in communication with the first base station, and the second mobile station is in communication with the second base station.

18. A mobile station in a system in which each of a plurality of base stations uses at least one of a plurality of frequency blocks to perform radio communication with at least one mobile station, wherein the plurality of base stations include, for each mobile station, a serving base station and one or more non-serving base stations, and wherein each of the plurality of base stations comprises means for transmitting pilot signals using each of the plurality of frequency blocks, the mobile station comprising:

means for measuring a signal-to-interference ratio (SIR) of each of the pilot signals which are received from the serving base station;

a first selection means for selecting frequency blocks on the bases of the measured SIRs;

means for measuring a reception power of each of the pilot signals which are received from the non-serving base stations;

second selection means for selecting frequency blocks from the frequency blocks selected by the first selection means, on the basis of the measured reception powers; and means for transmitting channel quality information, of each of the frequency blocks which are selected by the second selection means, to the base station.

19. The mobile station according to claim 18, wherein the first selection means selects frequency blocks whose SIRs are in a range between a maximum SIR and a value which is less than the maximum SIR by a predetermined amount.

20. The mobile station according to claim 18, wherein the second selection means converts the reception powers to interference levels, sums up the interference levels for each of the frequency blocks, and selects frequency blocks on the basis of the summed up interference levels in such a way that frequency blocks with lower summed up interference levels are preferentially selected.

21. A mobile station in a system in which each of a plurality of base stations uses one of a plurality of frequency blocks to perform radio communication with a mobile station, characterized by comprising:

means for receiving information concerning a reserved frequency block from a first base station;

means for measuring reception quality of pilot signals that a second base station transmits using the frequency blocks;

means for generating channel quality information based on the reception quality and information concerning a reserved frequency block, said channel quality information not including channel quality information related to said reserved frequency block;

means for selecting a predetermined number of frequency blocks based on the channel quality information generated; and means for reporting the channel quality information of the frequency blocks selected to the second base station.

22. A mobile station in a system in which each of a plurality of base stations uses at least one of a plurality of frequency blocks to perform radio communication with the mobile station, wherein the mobile station is a first mobile station in communication with a first base station, the first mobile station comprising:

means for receiving from a first base station information concerning a frequency block used for packet transmission destined to the first mobile station itself; and means for reporting to a second base station the information concerning the frequency block used for packet transmission, wherein a second mobile station selects a frequency block other than the frequency block used for packet transmission destined for the first mobile station based on the reported information, and wherein the second mobile station is in communication with the second base station.

23. A base station radio communication method in a system in which each of a plurality of base stations uses at least one of a plurality of frequency blocks to perform radio communication with a mobile station, characterized by comprising the steps of:

determining a frequency block used for radio communication between a first base station and a first mobile station;

reporting to a second base station the information concerning the frequency block used for radio communication;

using the determined reserved frequency block to transmit packets from the first base station to the first mobile station; and using a frequency block other than the frequency block reported from the first base station to perform radio communication between the second base station and a second mobile station, whereby the frequency block used for communication between the first base station and the first mobile station is kept different form the frequency block used for communication between the second base station and the second mobile station.

24. A base station in a system in which each of a plurality of base stations uses at least one of a plurality of frequency blocks to perform radio communication with a mobile station, wherein the base station is a first base station, characterized by comprising:

means for determining a frequency block used for radio communication with a first mobile station;

means for reporting to a second base station the frequency block used for radio communication; and means for using the determined frequency block to transmit packets to the first mobile station,
wherein the second base station uses a frequency block other than the frequency block reported from the first base station to perform radio communication with a second mobile station, and
wherein the frequency block used for communication between the first base station and the first mobile station is kept different from the frequency block used for communication between the second base station and the second mobile station.

25. A mobile station radio communication control program in a system in which each of a plurality of base stations uses one of a plurality of frequency blocks to perform radio communication with a mobile station, characterized by allowing a computer to realize the functions of:
   receiving information concerning a reserved frequency block from a first base station;
   measuring reception quality of pilot signals that a second base station transmits using the frequency blocks;
   generating channel quality information based on the reception quality and information concerning the reserved frequency block, said channel quality information is related to only said reserved frequency block;
   selecting a predetermined number of frequency blocks except the reserved frequency block based on the generated channel quality information; and
   reporting the channel quality information of the frequency blocks selected to the second base station.

26. A mobile station radio communication control program in a system in which each of a plurality of base stations uses one of a plurality of frequency blocks to perform radio communication with a mobile station, wherein the mobile station is a first mobile station which is in communication with a first base station, characterized by allowing a computer to realize the functions of:
   receiving from a first base station information concerning a frequency block used for packet transmission destined to the first mobile station itself; and
   reporting to a second base station the information concerning the frequency block used for packet transmission,
   wherein a second mobile station selects a frequency block other than the frequency block used for packet transmission destined for the first mobile station based on the reported information, and
   wherein the second mobile station is in communication with the second base station.

27. A base station radio communication control program in a system in which each of a plurality of base stations uses at least one of a plurality of frequency blocks to perform radio communication with a mobile station, characterized by allowing a computer to realize the functions of:
   determining a frequency block used for radio communication with a first mobile station;
   reporting to a second base station the information concerning the frequency block used for radio communication;
   using the determined reserved frequency block to transmit packets to the first mobile station; and
   wherein the second base station uses a frequency block other than the frequency block reported from the first base station to perform radio communication with a second mobile station based on the reported information,
   whereby the frequency block used for communication between the first base station and the first mobile station is kept different form the frequency block used for communication between the second base station and the second mobile station.

28. A non-transitory, computer-readable control program for mobile station radio communication in a system in which each of a plurality of base stations uses one of a plurality of frequency blocks to perform radio communication with at least one mobile station, wherein the plurality of base stations include, for each mobile station, a serving base station and one or more non-serving base stations, and wherein each of the plurality of base stations transmits pilot signals using each of the plurality of frequency blocks, characterized by allowing a computer to realize the functions of:
   measuring a signal-to-interference ratio (SIR) of each of the pilot signals which are received from the serving base station;
   performing a first selection step of selecting frequency blocks on the basis of the measured SIRs;
   measuring reception powers of the pilot signals which are received from the non-serving base stations;
   performing a second selection step of selecting frequency blocks from the frequency blocks selected in the first selection step, on the basis of the reception powers; and
   transmitting channel quality information, of each of the frequency blocks which are selected in the second selection step, to the base station.

* * * * *